(12) United States Patent
Makhotin et al.

(10) Patent No.: US 11,361,309 B2
(45) Date of Patent: Jun. 14, 2022

(54) MOBILE PAYMENT ROAMING

(71) Applicant: IDEMIA FRANCE, Courbevoie (FR)

(72) Inventors: Oleg Makhotin, Courbevoie (FR); Mehdi El-Haoussine, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 75 days.

(21) Appl. No.: 16/622,347

(22) PCT Filed: May 24, 2018

(86) PCT No.: PCT/EP2018/063697
§ 371 (c)(1),
(2) Date: Dec. 13, 2019

(87) PCT Pub. No.: WO2018/228798
PCT Pub. Date: Dec. 20, 2018

(65) Prior Publication Data
US 2020/0202332 A1  Jun. 25, 2020

(30) Foreign Application Priority Data
Jun. 15, 2017 (EP) .................................. 17305734

(51) Int. Cl.
G06Q 20/36 (2012.01)
G06Q 20/32 (2012.01)
G06Q 20/34 (2012.01)

(52) U.S. Cl.
CPC ..... *G06Q 20/3672* (2013.01); *G06Q 20/3224* (2013.01); *G06Q 20/341* (2013.01)

(58) Field of Classification Search
CPC .......... G06Q 20/3672; G06Q 20/3224; G06Q 20/341
See application file for complete search history.

(56) References Cited

U.S. PATENT DOCUMENTS 10,152,714 B2 * 12/2018 Beck .................. G06Q 20/4016
2002/0052965 A1    5/2002 Dowling
(Continued)

FOREIGN PATENT DOCUMENTS

EP    1197928 A2    4/2002
RU    2439695 C2    1/2012

OTHER PUBLICATIONS

International Search Report from Int'l Appl. No. PCT/EP2018/063697 dated Jun. 28, 2018, pp. 1-3.
(Continued)

*Primary Examiner* — Patrick McAtee
*Assistant Examiner* — Terry Nathan Murray
(74) *Attorney, Agent, or Firm* — MH2 Technology Law Group LLP

(57) ABSTRACT

The invention relates to a method implemented by a system (S1) comprising a first server (H-TSP) of a home token service provider and a second server (R-TSP) of a roaming token service provider, the method comprising: receiving (S86), by the second server, a roaming token (R-PAN) allocated to a mobile payment card (C1) for operating in a roaming banking network (R-NT); obtaining (S88), by the second server, based on the roaming token (R-PAN), a home token (H-PAN) allocated to the mobile payment card for operating in a home banking network (H-NT); receiving (S94), by the first server, the home token (H-PAN); and obtaining (S96), by the first server, based on the home token (H-PAN), a primary card number (C-PAN) of the mobile payment card for operating in the home banking network.

11 Claims, 15 Drawing Sheets

(56) References Cited

U.S. PATENT DOCUMENTS

| | | |
|---|---|---|
| 2007/0061873 A1 | 3/2007 | Shewchuk et al. |
| 2010/0258620 A1* | 10/2010 | Torreyson .......... G06Q 20/3572 |
| | | 235/379 |
| 2011/0095086 A1 | 4/2011 | Malhotra et al. |
| 2011/0184858 A1* | 7/2011 | Shakkarwar .......... G06Q 40/02 |
| | | 705/39 |
| 2011/0295750 A1 | 12/2011 | Rammal |
| 2012/0259782 A1* | 10/2012 | Hammad .............. G06Q 20/382 |
| | | 705/44 |
| 2014/0214626 A1* | 7/2014 | Bowers .............. G06Q 30/0635 |
| | | 705/26.81 |
| 2015/0041534 A1* | 2/2015 | Rayner ................ G06Q 20/327 |
| | | 235/380 |
| 2015/0088745 A1* | 3/2015 | Phillips ................ G06Q 20/389 |
| | | 705/44 |
| 2015/0112870 A1 | 4/2015 | Nagasundaram et al. |
| 2015/0178724 A1 | 6/2015 | Ngo et al. |
| 2015/0254642 A1* | 9/2015 | Bondesen .......... G06Q 20/3278 |
| | | 705/41 |
| 2015/0254770 A1 | 9/2015 | Bondesen et al. |
| 2015/0348029 A1* | 12/2015 | Van Os ................. G06Q 20/36 |
| | | 705/44 |
| 2017/0186008 A1* | 6/2017 | Pachouri ............ G06Q 20/3278 |

OTHER PUBLICATIONS

Russian Office Action from corresponding Russian Appl. No 2020100935/28(001406) dated Nov. 17, 2020, 6 pages.

* cited by examiner

MOBILE PAYMENT ROAMING

CROSS-REFERENCE TO RELATED APPLICATIONS

This application is the National Phase of PCT International Application No. PCT/EP2018/063697, filed on 24 May 2018, which claims priority to European Patent Application No. 17305734.0, filed on 15 Jun. 2017, both of which are hereby expressly incorporated by reference into the present application.

BACKGROUND

The present disclosure relates generally to the field of mobile applications for performing financial transactions, such as payment transactions. The disclosure relates more particularly, but not exclusively, to managing a digital wallet application in a mobile device for enabling a user to perform transactions, such as payment transactions, in a particular payment network.

Payments for products and services are often achieved using credit cards, debit cards or any other kind of payment card. Mobile payment systems based on mobile wallets are becoming more popular due to the convenience of being able to make a payment or purchase from the user's mobile device or smart phone. Payment and service providers are providing this functionality to users, usually by means of a mobile application (or applet) which is run on a mobile device. This mobile application allows a user to make payment through a credit card issuer or bank, or through a third party payment provider.

Mobile payments using a mobile wallet typically involve a user registering details of a payment card on a mobile device. The mobile device stores a mobile wallet which can be used to make payment using the payment card. In a mobile wallet payment transaction, a consumer may present his/her mobile device which provides details of the payment card to the reader terminal of a merchant. The merchant then uses this information to authorize the transaction.

Nowadays, mobile payment cards, just like actual payment cards, are configured to be compatible with specific payment networks (or banking networks) within which they may be used to perform financial transactions. Typically, a mobile payment card is configured in a digital wallet to operate in a national payment network in accordance with the card issuer specifications. To this end, the digital wallet application of the user is provided with card details (identifier, keys, parameters etc.) compatible with this national payment network. In France, for instance, the payment network known a "Banking Card" (or CB, standing for "Cartes Bancaires" in French) is the domestic payment network commonly used to perform a payment transaction using a mobile payment card issued by a French bank.

However, roaming users may happen to be out of reach of the national payment network their mobile payment card is configured to operate with. A user may face difficulties to perform a financial transaction, such as a payment, when roaming in a region where the available payment networks do not accept the mobile payment card, for instance when roaming outside a domestic area of the user.

The well-established standard for roaming payment today is to use a global payment network such as VISA™ or MASTERCARD™ payment networks. Such global networks are advantageous in that they cover wide geographical areas and thus offer an easily-accessible roaming payment solution to end users. However, the current payment networks may also present drawbacks and using them for roaming payments is not always satisfactory.

There is thus a need in the art for an efficient payment roaming solution.

SUMMARY OF THE INVENTION

As mentioned above, a user roaming in different areas (e.g., changing countries) may happen to be out of reach of a national payment network his/her mobile payment card is configured to operate with. Just like for actual payment cards, a mobile wallet may thus be configured to use a mobile banking card in an international payment network when in a situation of roaming.

The well-established standard today for payment roaming is for users to use a single global payment network such as international payment networks operated by VISA™ or MASTERCARD™.

However, a roaming user may not wish to use an international payment network for performing a payment transaction. Additionally, some actors in the field of mobile payment solutions tend to promote the deployment and use of national payment systems rather than international ones.

The present invention attempts to remedy the above-mentioned concerns and, more generally, to allow the use of a mobile payment card while a user is roaming. The invention provides for an efficient roaming mobile payment solution.

To remedy the above-mentioned concerns, the present invention diverges from the current well-established practice of using a single global payment for performing roaming payments and instead provides a solution based on a new approach, i.e. rendering compatible two distinct patent networks (i.e. a home payment network and a roaming payment network) so that they can cooperate with each other to allow payment roaming.

Today, the lack of interoperability between national payment networks results from the different, often incompatible, specifications of each payment networks. While there is a global effort for implementing a worldwide standardised payment system, such a solution will likely require considerable time and effort before it emerges.

The present invention provides an efficient solution for payment roaming by establishing interoperability between multiple payment networks, thereby allowing roaming payments to be made through a combination of two (or more) distinct payment networks instead of using a single global payment network as is the well-established practice today.

The invention provides a processing method implemented by a system comprising a first server of a home token service provider and a second server of a roaming token service provider, said method comprising successively:
receiving, by the second server, a roaming token allocated to a mobile payment card for operating in a roaming banking network;
obtaining, by the second server, based on the roaming token, a home token allocated to the mobile payment card for operating in a home banking network other than said roaming banking network;
receiving, by the first server, the home token; and
obtaining, by the first server, based on the home token, a primary card number of the mobile payment card for operating in the home banking network.

In a particular embodiment, the method further comprises, after the first server obtains the primary card number, sending by said first server said primary card number for allowing a transaction in the home banking system using said mobile payment card.

In a particular embodiment, the method further comprises successively, before the second server receives the roaming token:
- receiving, by the first server, a first identifier associated with the home token;
- determining, by the first server, the home token based on the first identifier;
- receiving, by the second server, the home token determined by said first server; and
- storing, by the second server, the home token in association with the roaming token.

In a particular embodiment, the system further comprises a third server (H-SV) of the home banking system and a fourth server (R-SV) of the roaming banking network, said third and fourth servers being connected via a host-to-host connection, wherein:
- the roaming token is received by the second server from the fourth server; and
- the home token received by the third server is routed from the fourth server using the host-to-host connection between the third and fourth servers.

In a particular embodiment, the primary card number is sent by the third server in a transaction request after receiving said primary card number from the first server.

In a particular embodiment, the system further comprises a third server of a token service operator, said method further comprising:
- the third server routing a transaction request including the home token from the second server to the first server.

In a particular embodiment of the invention, the various steps of the processing method according to the invention are specified by computer program instructions.

Accordingly, the invention also provides a computer program on a recording medium, this computer program being arranged to be implemented by a server, and more generally by a processor, this computer program comprising instructions adapted for the implementation of the first processing method as defined above.

The invention also provides a non-transitory recording medium readable by a server, or more generally by a processor, this recording medium comprising computer program instructions as mentioned above recorded thereon.

The recording medium previously mentioned can be any entity or device capable of storing the computer program. For example, the recording medium can comprise a storing means, such as a ROM memory (a CD-ROM or a ROM implemented in a microelectronic circuit), or a magnetic storing means such as a floppy disk or a hard disk for instance.

The recording medium of the invention can correspond to a transmittable medium, such as an electrical or an optical signal, which can be conveyed via an electric or an optic cable, or by radio or any other appropriate means. The computer program according to the invention can in particular be downloaded from the Internet or a network of the like.

Alternatively, the recording medium can correspond to an integrated circuit in which a computer program is loaded, the circuit being adapted to execute or to be used in the execution of the methods of the invention.

The invention also concerns a system comprising a first server of a home token service provider and a second server of a roaming token service provider, wherein said second server comprises:
- a first receiving module for receiving a roaming token allocated to a mobile payment card for operating in a roaming banking network; and
- a first obtaining module for determining, based on the roaming token, a home token allocated to the mobile payment card for operating in a home banking network other than said roaming banking network;

and wherein the first server comprises:
- a second receiving module for receiving the home token obtained by said first obtaining module; and
- a second obtaining module for obtaining, based on the home token, a primary card number of the mobile payment card for operating in the home banking network.

The particular embodiments defined above with respect to the processing method apply in an analogous manner to the system of the present invention.

In a particular embodiment, the first server further comprises a sending module for sending the primary card number for allowing a transaction in the home banking system using said mobile payment card.

In a particular embodiment, the system is such that:
- the first server is configured to receive a first identifier associated with the home token and to determine the home token based on the first identifier; and
- the second server is configured, before receiving the roaming token, to receive the home token determined by said first server and to store the home token in association with the roaming token for later retrieval by the first obtaining module.

In a particular embodiment, the system comprises a third server (H-SV) of the home banking system and a fourth server (R-SV) of the roaming banking network, said third and fourth servers being connected via a host-to-host connection, wherein:
- the second server (R-TSP) is configured to receive the roaming token (R-PAN) from the fourth server (R-SV); and
- the fourth server (R-SV) is configured to route the home token (H-PAN) to the third server (H-SV) using the host-to-host connection between the third and fourth servers (H-SV, R-SV).

In a particular embodiment, the system comprises a third server of a token service operator, said third server being configured to route a transaction request including the home token from the second server to the first server.

Where functional modules are referred to in the present disclosure for carrying out various steps of the described methods, it should be understood that these modules may be implemented in hardware, in software, or a combination of the two. When implemented in hardware, the modules may be implemented as one or more hardware modules, such as one or more application specific integrated circuits. When implemented in software, the modules may be implemented as one or more computer programs that are executed on one or more processors.

Each step, which may be performed by a technical entity as described in the present document, may correspond to a specific functional module. A given functional module may be configured to perform a plurality of steps.

The present invention provides for an efficient roaming mobile payment solution. In particular, it allows efficient interoperability of mobile payment cards with multiple payment networks that a user may access using his/her mobile device.

Interoperability is ensured between scheme partners while an adequate level of security can be maintained in the transaction process. By performing a double detokenization during the transaction, the invention allows each payment system to use its tokens in an efficient manner.

The invention obviates the need for an international payment network, for instance. When a user is roaming outside his national (or regional) payment network, a mobile bank transaction may be advantageously performed in another national (or regional) payment network. The invention can ensure adequate interoperability between distinct payment systems having different specifications, such that using an international payment network is no longer required. Domestic banking schemes can get international acceptance via roaming agreements with other banking schemes. Standard co-badge bi-lateral contacts and host-to-host integrations can for instance be signed.

BRIEF DESCRIPTION OF THE DRAWINGS

The disclosure will be better understood and illustrated by means of the following embodiment and execution examples, in no way limitative, with reference to the appended figures on which.

Figure 1:
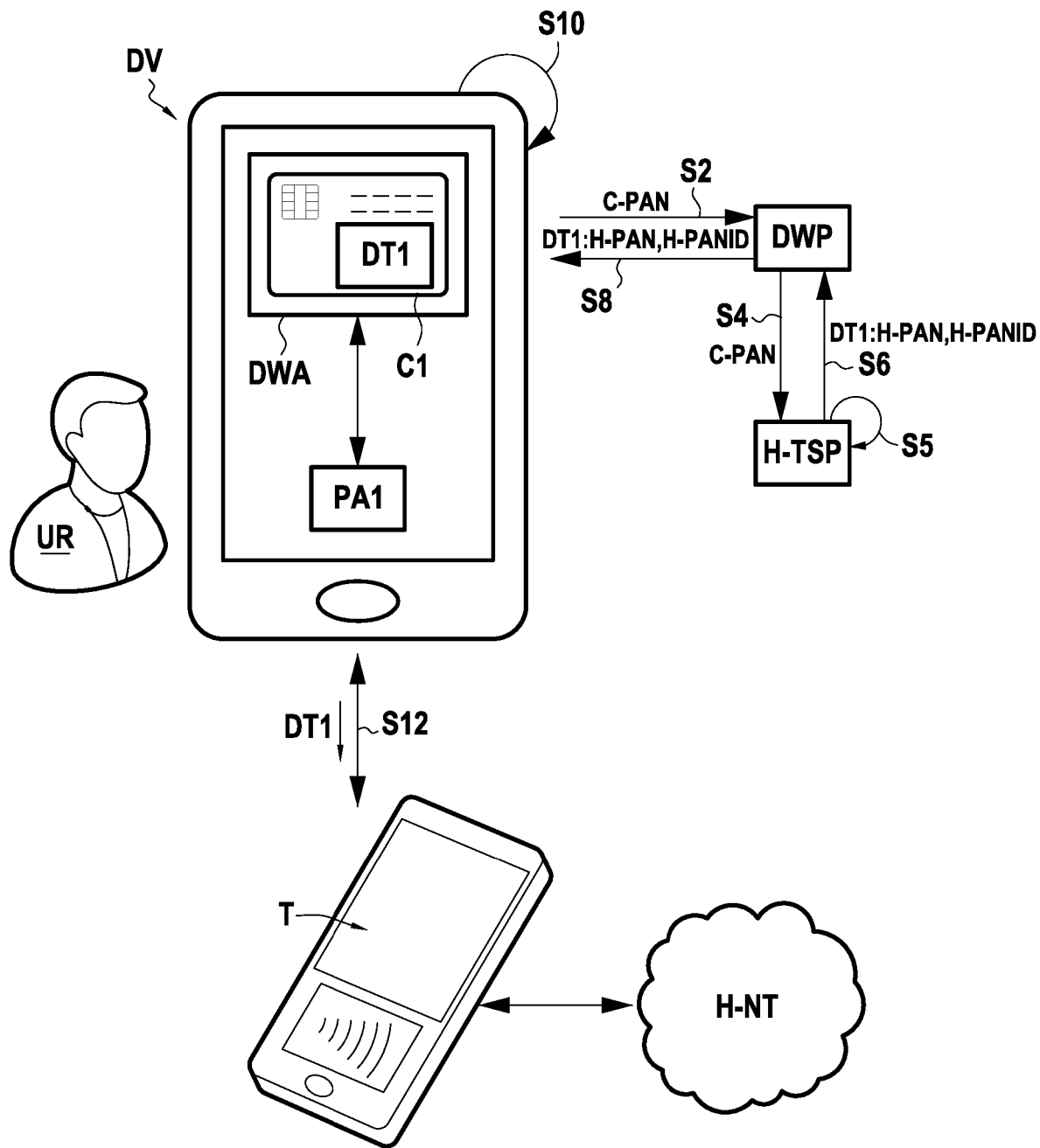
FIG. 1 is a schematic diagram representing the structure of, and steps performed by, an environment comprising a mobile device and a server of home token service provider, in accordance with a particular embodiment of the present invention.

In the FIGS. 1-15, some represented blocks are purely functional entities, which do not necessarily correspond to physically separate entities. Namely, they could be developed in the form of software, hardware, or be implemented in one or several integrated circuits, comprising one or more processors.

For simplicity and clarity of illustration, the same reference numerals will be used throughout the figures to refer to the same or corresponding elements, unless indicated otherwise.

The components in the figures are not necessarily to scale, emphasis instead being placed upon illustrating the principles of the invention.

DESCRIPTION OF PARTICULAR EMBODIMENTS OF THE INVENTION

While the present disclosure is susceptible of embodiment in many different forms, there are shown in the drawing and will be described herein in detail specific embodiments thereto with the understanding that the present disclosure is to be considered as an exemplification of the principles of the disclosure and is not intended to limit the disclosure to the specific embodiments illustrated. Instead, the scope of the invention is defined by the appended claims.

Many specific details of the invention are set forth in the following description and in the FIGS. 1-10B. One skilled in the art, however, will understand that the present invention may have additional embodiments, or that the present invention may be practiced without some of the details described in the following description. In other instances, well-known methods, procedures, and components have not been described in detail to avoid obscuring the embodiments described therein.

The present invention provides for a mobile device, server, system and corresponding methods for allowing a transaction to be performed in an efficient manner using a mobile payment card. More particularly, the invention allows for roaming payment transactions using a digital wallet provided with a mobile payment card in a mobile device. The invention aims at allowing efficient interoperability between multiple payment systems such that a same mobile payment card can be used easily with different payment networks, such as national or regional payment networks for instance.

FIG. 1 shows an environment, according to a particular embodiment of the invention, comprising a mobile device DV, a digital wallet provider server DWP, a server H-TSP of a home token service provider and a reader terminal T.

The mobile device DV may be used by a user UR to perform payment transactions in a payment network. To this end, the mobile device DV implements a digital wallet application (or applet) DWA capable of using data of a mobile payment card to perform mobile payments. In the initial state shown in FIG. 1, the digital wallet application DWA is configured with a first set of data DT1 associated with a mobile payment card C1. This digital wallet application can retrieve and use the data DT1 stored in the mobile device DV to perform transactions in a home payment network H-NT (or home payment system).

The mobile payment card C1 is a virtual (or digital) card which can be displayed on a screen of the mobile device DV and which can be used in a dematerialised form to complete financial transactions, such as payment transactions.

In the present document, embodiments are described in the context of payment transactions, although the invention is not limited thereto and applies more generally to any kind of mobile banking (or financial) transaction.

The mobile device DV may be a smart phone, a tablet or any suitable mobile communication device equipped with processing resources for managing the digital wallet application DWA. In the example embodiments contemplated in the present document, the mobile device is a smart phone or an equivalent apparatus. This smart phone may communicate over a cellular network using authenticating data stored in a SIM card or the like.

As shown in FIG. 1, the mobile device DV may also implement a payment application PA1 which can be used in cooperation with the digital wallet application DWA to perform operations (configuration, payment transaction . . . ) with respect to the mobile payment card C1.

FIG. 1 illustrates, in accordance with a particular embodiment of the invention, how the digital wallet application DWA can be initially configured with the set of data DT1 corresponding to the mobile payment card C1.

In a step S2, the mobile device DV retrieves a primary account number (or payment card number) PAN, designated as C-PAN, allocated to the mobile payment card C1 for operating in the home payment network H-NT. The primary account number is a well-known identifier of a payment card, sometimes referred to as payment card number. This number identifies the issuer of the card. This primary account number (or identifier) C-PAN may be stored in the mobile device DV so that it can be retrieved by the digital wallet application DWA in step S2. The mobile device DV, under control of the digital wallet application DWA, then sends (S2) the C-PAN to the server DWP of a digital wallet service provider.

The server DWP transmits (S6) the payment card's account number C-PAN to the server H-TSP of the home token service provider. This server H-TSP is in charge of providing cardholders with a digital token to be used in replacement of the PAN number. A PAN is a sensitive data and, therefore, the diffusion thereof should be limited for a matter of security.

In response to the account number C-PAN, the server H-TSP returns (S6) the first set of data DT1 which is received by the server DWP and forwarded (S8) to the mobile device DV. The set of data DT1 includes a home token H-PAN allocated to the mobile payment card C1 to operate with the home payment network H-NT. The first set of data DT1 may comprise additional data such as an identifier H-PANID corresponding to the home token H-PAN.

Additionally, the server H-TSP stores (S5), in a database for instance, the home token H-PAN in association with the account number C-PAN received from the digital wallet application DWA.

The home token H-PAN, which may take any appropriate digital form (such as a code, a sequence of characters etc.), is a less sensitive data than the primary account number C-PAN. The home token H-PAN can be restricted in use only in a particular device and specified transaction environment (so called transaction domain restrictions). The home token H-PAN can be used by the digital wallet application DWA instead of the account number C-PAN, thereby allowing for a more secure payment system.

In a step S10, the mobile device DV configures the digital wallet application DWA with the received first set of data DT1 for enabling it to perform payment transactions in the home payment network H-NT. As part of this configuration, the mobile device DV may personalise the visual aspect (card picture, logo, colours etc.) of the graphical user interface (GUI) of the digital wallet application DWA with visual parameters included in the first set of data DT1 provided by the server H-TSP.

Additionally, the mobile device DV stores (S10) the set of data DT1 for later retrieval by the digital wallet application DWA.

Once this initial configuration is completed, the user UR is able to use the digital wallet application DWA run on the mobile device DV to complete a payment transaction in the home payment network H-NT. To this end, the user UR may present the mobile device DV near a payment terminal T of a merchant, as shown in FIG. 1. The mobile device DV may cooperate (S12) with the payment terminal T in any appropriate manner to perform a mobile payment. In particular, the mobile device DV transmits the first set of data DT1, or at least the home token H-PAN, so that the transaction can be authenticated by the terminal T. As mentioned earlier, transmission of the sensitive primary account number C-PAN can be avoided as it is the home token H-PAN which is used instead.

Figure 2:
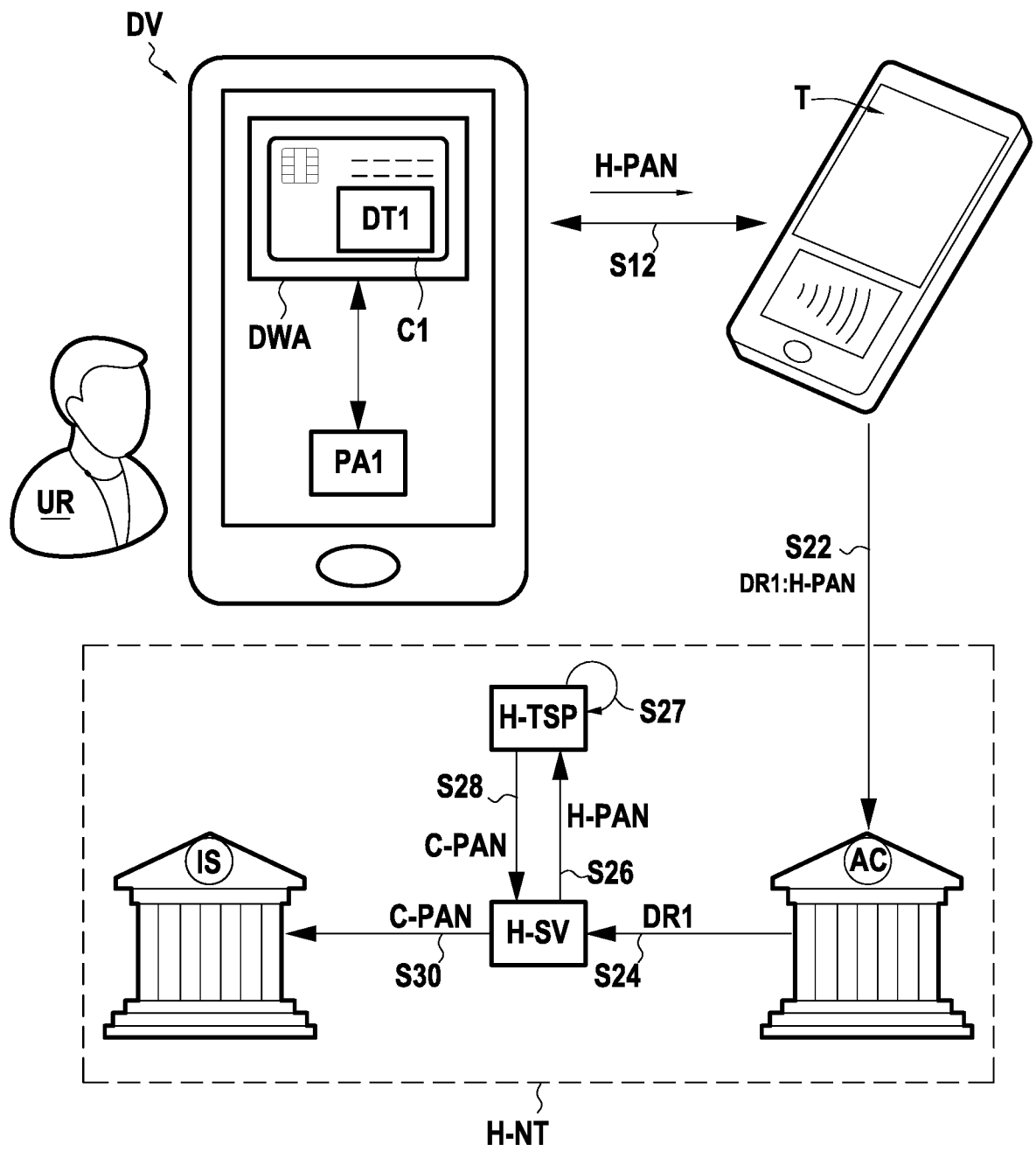
FIG. 2 is a schematic diagram representing the structure of, and steps performed by, an environment comprising a mobile device in accordance with a particular embodiment of the present invention.

FIG. 2 depicts, in accordance with a particular embodiment of the invention, how a payment transaction can be performed by the mobile device DV using the mobile payment card C1 in the home payment network H-NT.

In a step S12, the mobile device DV sends the home token H-PAN to payment terminal T, as already described above with respect to FIG. 1. Other information included in the first set of data DT, such as the expiring date of the payment card C1, can be transmitted along to the terminal T.

In a particular example, the mobile device DV and the payment terminal T cooperate (or interact) with each other according to the EMV standard ("Europay, MasterCard, and Visa") or proprietary that may or may not be derived from EMV, to perform the payment transaction. This can be made through a contactless communication between the mobile device DV and the terminal T, using for instance NFC interfaces or the like (Bluetooth . . . ).

During this interaction S12, the digital wallet application DWA may interact with the payment application PA1 deployed by the issuing bank of the payment mobile card C1.

The payment terminal T, positioned for instance in a point of sale of a merchant, then transmits (S22) transaction data DR1 to the bank system AC of the acquirer (e.g., the merchant's bank). The transaction data DR1 contains any data (date, transaction amount . . . ) characterising the payment transaction for allowing further processing such as authentication, validation . . . . In particular, the transaction data DR1 includes the home token H-PAN provided by the digital wallet application DWA of the mobile device DV.

In step S24, the bank system AC of the acquirer transmits the transaction data DR1 to a routing server H-SV of the home payment network H-NT. This server H-SV forwards (S26) the home token H-PAN to the server H-TSP of the home token service provider.

The server H-TSP then determines (S27) the primary account number C-PAN stored (see S5 in FIG. 1) in association with the home token H-PAN received in S26, and returns (S28) this account number C-PAN to the server H-SV.

In step S30, the server H-SV forwards, to the bank system IS of an issuer, the primary account number C-PAN along with any other useful information that may have been received in the transaction data DR1 (amount, date . . . ). The issuer IS, which is for instance the issuing bank of the mobile payment card C1, may then process the payment transaction based on the primary account number C-PAN allocated to the mobile payment card C1 to operate with the home payment network H-NT.

As described above, the home payment network H-NT, and more particularly the server H-TSP, allows for a detokenization process thereby obtaining a PAN identifier from a digital token.

In the present example, the bank system AC of the acquirer, the servers H-SV and H-TSP, and the bank system IS of the issuer are all part of the home payment network H-NT, as shown in FIG. 2.

Thanks to the first set of data DT1 provisioned to the digital wallet application DWA, the user UR may thus use the mobile payment card C1 in the home payment system. The term "home" in this context is merely used as a convention to designate a payment network or system with which the digital wallet application DWA is initially compatible with for performing a payment transaction using the data of the mobile payment card C1. It is typically the issuer of the mobile payment card which defines which payment system(s) correspond(s) to the home payment system(s) of the card.

However, it should be noted that the transaction may only be performed between the mobile device DV and the payment terminal T if both devices are configured in a compatible manner. In other words, the transaction can be successfully processed only if the payment terminal T is also configured to operate in the home payment network H-NT. If the payment terminal T is part of a different payment network, having specifications incompatible with those of the home payment network, the transaction will fail. This may happen for instance when a roaming mobile payment is attempted using the mobile payment device C1, while the mobile device DV is roaming outside the home payment network H-NT.

If, for instance, the mobile device DV is roaming and the digital wallet application DWA attempts a transaction with a payment terminal attached to a roaming payment network incompatible with the present configuration of the digital wallet application DWA, the transaction will fail.

An aim of the invention is to overcome these problems.

Figure 3:
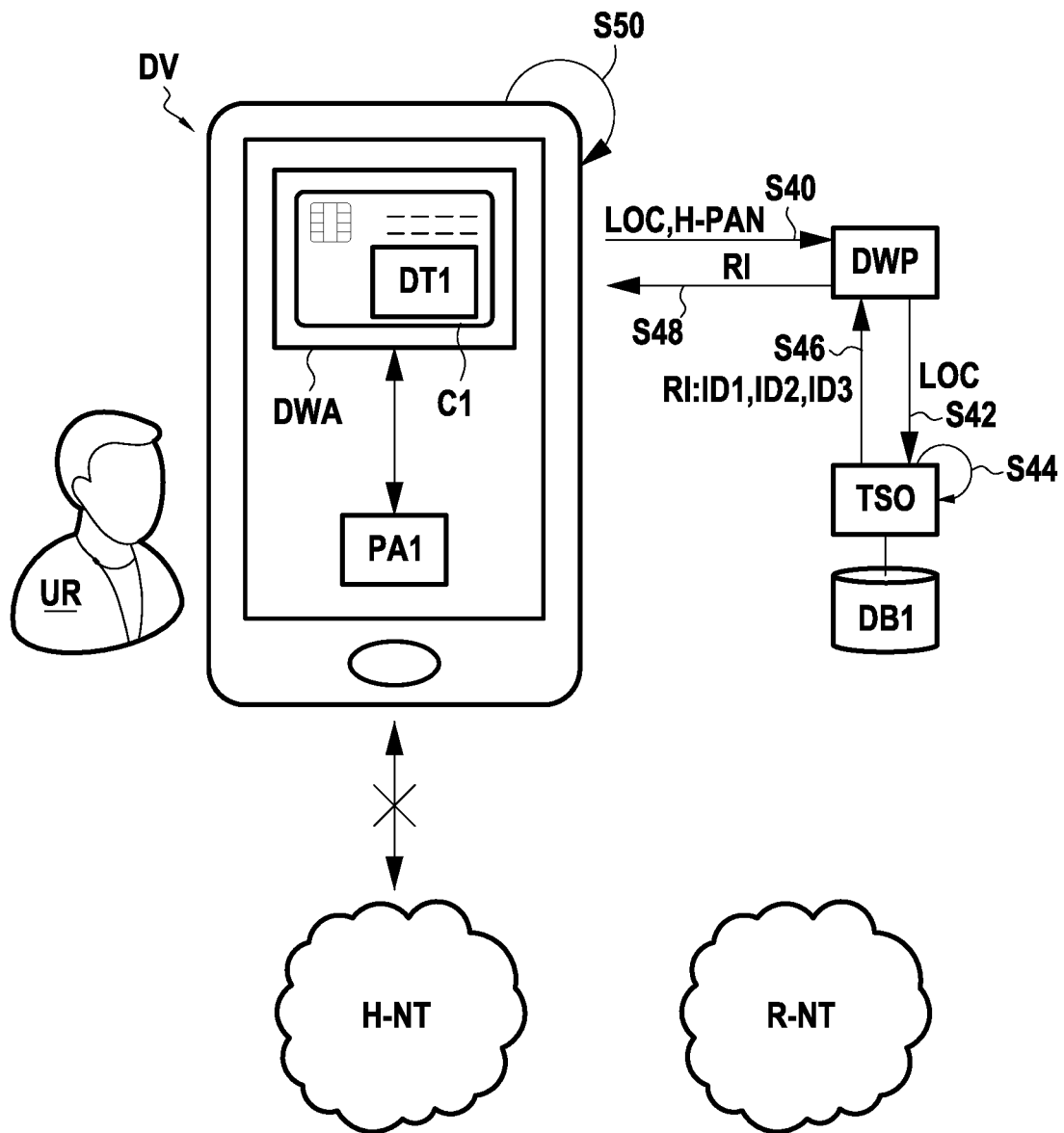
FIG. 3 is a schematic diagram representing the structure of, and steps performed by, an environment comprising a mobile device and a server of a token service operator, in accordance with a particular embodiment of the present invention.

FIG. 3 shows, in accordance with a particular embodiment of the invention, an environment comprising the mobile device DV and the digital wallet server DWP as described above with respect to FIGS. 1 and 2, along with a server TSO of a token service operator which may access a database DB1.

A detailed implementation of the mobile device DV, in accordance with a particular embodiment of the present invention, will be described later with respect to FIGS. 4A and 4B. Likewise, a detailed implementation of the server TSO, in accordance with a particular embodiment of the present invention, will be described later with respect to FIGS. 5A and 5B.

As shown in FIG. 3, it is assumed that the user UR is roaming such that the mobile device DV is out of reach of the home payment network H-NT. FIG. 3 depicts how the digital wallet application DWA may detects a roaming payment network, other than the home payment network H-NT, which may be access to perform payment transactions.

In a step S40, the mobile device DV sends an information request containing location information LOC representative of the mobile device DV's current position. In the present example, the sending S40 of this information request is commanded by the digital wallet application DWA.

In a particular example, the digital wallet application DWA triggers the sending of this information request upon detection that the mobile device DV is roaming outside (i.e. out of reach of) the home payment network H-NT. For instance, the cardholder UR is roaming in a roaming area (or country), that is, an area (or country) other than a predefined area within which the home payment network H-NT can be accessed.

In a particular example, the digital wallet application DWA triggers the sending (S40) of this information request upon detection that the mobile device DV is roaming in a cellular network other than a predefined home cellular network. To this end, the digital wallet application DWA may monitor the cellular network to which the mobile device DV is attached. For instance, when the user UR is roaming abroad, the mobile device DV may attach to a roaming cellular network distinct from a home cellular network. Based on the identifier of this roaming cellular network, the mobile device DV (or more particularly the digital wallet application DWA) may determine that the home payment network can no longer be accessed and thus triggers the sending (S40) of the information request.

In a particular example, the digital wallet application DWA triggers the sending (S40) of the information request upon detection that the mobile device DV is outside a predefined geographical area, designated as home area. To this end, the digital wallet application DWA may monitor the geographical position of the mobile device DV, using for instance a localisation module 14 as described later with respect to FIGS. 4A and 4B. For instance, when detecting that the mobile device DV is roaming in Germany, and thus outside France which is predefined as the home area, the digital wallet application DWA may determine that the home payment network can no longer be accessed and thus triggers the sending (S40) of the information request.

As mentioned earlier, the information request comprises location information LOC representative of the mobile device DV's current position. The location information may comprise at least one of:
 geographical information (e.g., GPS coordinates, country, area, city etc.) representative of a geographical position of the mobile device DV; and
 a network identifier indicating a cellular network, or a part thereof, to which the mobile device DV is connected.

The current position represented by the location information LOC may be a last known position detected by the mobile device DV.

The digital wallet application DWA may monitor the geographical or network position of the mobile device DV and compare it with predefined location criteria. Based on the comparison result, the digital wall application DWA determines whether the information request containing the location information LOC must be sent in S40.

In the present example, the mobile device DV sends (S40) the information request to the digital wallet server DWP which then forwards (S42) it to the server TSO of the token server operator. As will be seen in the embodiments described therein, the server TSO is in charge of handling tokens which are provided to the digital wallet application DWA and later used in payment transactions.

In a step S44, the server TSO determines, based on the location information LOC, at least one roaming payment network which may be used or accessed by the mobile device DV, and more particularly by the digital wallet application DWA. In other words, the server TSO determines one or more roaming payment networks which are available to the user for performing payment transactions while roaming at the position corresponding to the location information LOC. To do so, the server TSO may consult the database DB1 which stores a list of at least one payment network in association with a particular location or area. As mentioned above, the mobile device's location may be defined at a cellular network level and/or at a geographical level. The database DB1 may store network information characterising at least one payment network which can be accessed in a respective area.

According to the present embodiment, particular roaming agreements may be made between banks and payment scheme operators all over the world. Domestic schemes may get international acceptance via roaming agreements with other schemes by signing co-badge bi-lateral contacts and host to host integrations, as will be more apparent hereafter.

In the present example, it is assumed that the server TSO identifies (S44) three roaming payment networks which can be potentially used by the digital wallet application for the purpose of payment transactions. Accordingly, the server TSO sends back (S46) roaming information RI to the digital wallet server DWP, this roaming information RI identifying the plurality of roaming payment networks identified as available in S44. In the present case, the roaming information includes identifiers ID1, ID2 and ID3 of the three respective roaming payment networks identified by the server TSO.

In a step S48, the digital wallet server DWP forwards the roaming information RI to the mobile device DV.

Based on the roaming information RI, the digital wallet application DWA then selects (S50) a roaming payment network (or roaming payment system), noted R-NT, among the three selectable options ID1-ID3 identified by the server TSO. The roaming information RI provided by the server TSO may include, in addition to the identifiers ID1-ID3, any other information that may help the digital wallet application DWA in its process of selecting a roaming payment network.

In the present case, the roaming payment network R-NT selected (S50) by the digital wallet application DWA is different from the home payment network H-NT with which it was initially configured to operate with.

In a particular example, the roaming information RI includes various information characterising the available roaming payment networks, such as interchange rates (fee structure), parameters etc.

In a particular example, the roaming information includes at least one of:
  parameters associated with at least one roaming bank network, said parameters defining at least one of service rates and an acceptance area; and
  priority information defining a priority order according to which each roaming payment network is to be selected by the mobile device DV.

In the present example, the roaming information RI includes priority information which defines the roaming payment network R-NT as the network to be selected in priority by the digital wallet application DWA. The priority information may define a priority order according to a plurality of roaming payment networks R-NT should be selected. In the roaming information RI, multiple priority values may be assigned to each available roaming payment networks as a function of criteria such as the date, the type of transaction to be made etc.

In the present invention, the way the roaming payment network is selected by the digital wallet application DWA can be dynamically adapted over time depending on various factors. In particular, the database DB1 may be regularly updated to modify the roaming payment networks which are presented as options to a digital wallet application at a particular location. The criteria upon which the digital wallet application DWA makes its selection S50 may also be adapted over time.

The selection S50 may be completely automatic or may require confirmation by the user UR.

In a particular example, the roaming information RI identifies only a single roaming payment network.

Furthermore, the server TSO may be configured to perform a pre-selection of roaming payment networks available to the user UR among a plurality of possible roaming payment networks. This pre-selection can be made based on the identity of the mobile device DV or of the user.

In a particular example, the digital wallet application DWA commands the mobile device DV to send in step S40 the home token H-PAN along with the location information LOC (FIG. 3). The home token H-PAN and the location information LOC are transferred (S42) by the digital wallet server DWP to the server TSO. In step S44, the server TSO takes into account the location information LOC and the home token H-PAN to determine the at least one roaming payment network which may be used or accessed by the mobile device DV, and more particularly by the digital wallet application DWA. The home token H-PAN enables the server TSO to check which roaming payment network the user UR is authorised to access and use with his/her mobile payment card C1. In a particular example, the server TSO may consult the database DB1 which indicates, for each existing payment network at a particular location, whether access thereto is authorised for the user UR of the mobile payment card C1. The server TSO may then identify (S46, FIG. 3) in the roaming information RI only the existing roaming payment network(s) that the user is authorised to access. In a variant, an identifier of the mobile device DV, such as a MAC identifier for instance, is sent (S40) by the mobile device DV and used (S44) as a roaming payment network selection criterion instead of the home token H-PAN.

As described above in the present embodiment, the mobile device DV sends (S40) the information request containing the location information LOC to the digital wallet server DWP which forwards it to the server TSO. Other embodiments are however possible.

In a variant, the mobile device DV sends directly the information request to the server TSO, without passing through the digital wallet server DWP. In this case, the digital wallet application DWA may cooperate with the payment application PA1 within the mobile device DV. The server H-TSP may serve as a routing interface between the mobile device DV and the server TSO. In another variant, a TSO mobile application (not shown) originating from the token service operator may be implemented in the mobile device DV and may cooperate with the digital wallet application DWA. In this case, this TSO mobile application may allow the mobile device DV to interact directly with the server TSO to send (S40) the information request and receive (S48) in return the roaming information RI.

Figure 4A:
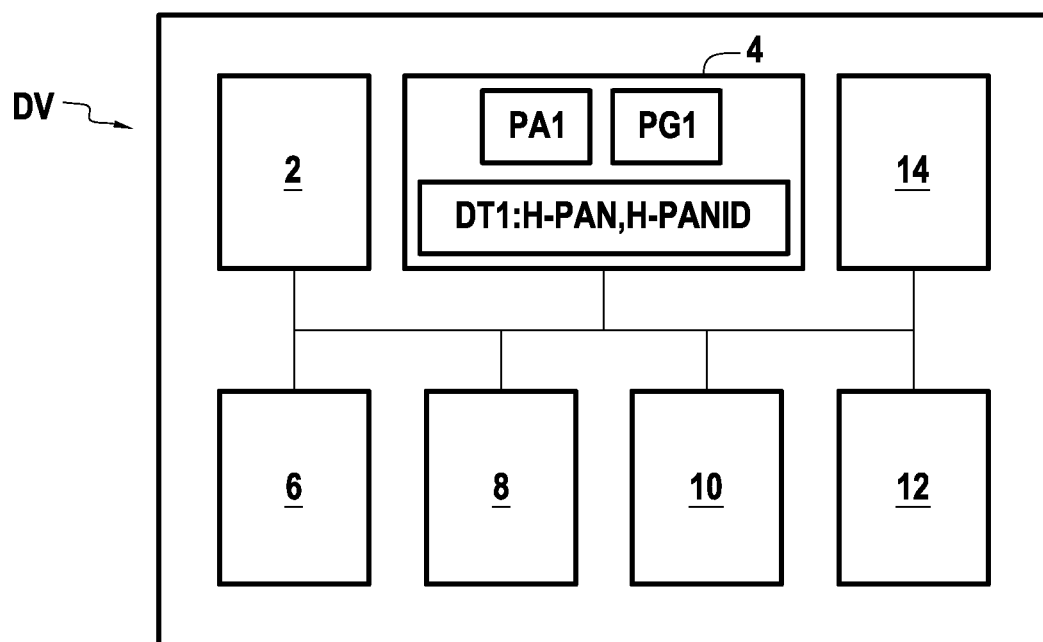
FIG. 4A shows the structure of a mobile device in accordance with a particular embodiment of the present invention.

FIG. 4A shows, in accordance with a particular embodiment of the invention, the structure of the mobile device DV already described above. In this example, the mobile device DV presents the hardware architecture of a smart phone, or more generally of a computer. In particular, the mobile device DV comprises a processor 2, a rewritable non-volatile memory 4 (e.g., a Flash), a RAM memory 6, a first communication interface 8, a second communication interface 10 and a human-to-machine interface 12. Some elements typically included in a smart phone have been voluntarily omitted in the present embodiment to enhance clarity of the present disclosure.

The rewritable non-volatile memory 4 of the mobile device DV constitutes a non-transitory recording medium in accordance with a particular embodiment of the invention. This memory includes a computer program PG1 according to a particular embodiment of the invention, this computer program comprising instructions to implement a method according to a particular embodiment of the invention. In the present example, the computer program PG1 correspond to the digital wallet application DWA implemented in the mobile device DV.

The rewritable non-volatile memory 4 may also store the first set of data DT1 provisioned by the server H-TSP of the home token service provider, as described above with reference of FIG. 1. In the present example, the data DT1 includes the home token H-PAN and an identifier H-PANID associated with the home token H-PAN.

Still further, the memory 4 may store a second set of data DT2 as will be described later.

The memory 4 may also store a computer program to implement the payment application PAL The first interface 8 is a communication interface that is used by the mobile device DV to communicate over a cellular phone network. Any appropriate mobile communication standard such as 3G, 4G, LTE etc. can be contemplated in the present case.

The second interface 10 is a contactless interface to perform contactless communication with payment terminals, such as terminal T depicted in FIG. 1. This interface 10 may be an NFC interface, a Bluetooth interface or the like. The mobile device 10 may use this second interface 10 to perform a payment transaction with a payment terminal.

The human-to-machine interface may include any appropriate means (screen, keyboard . . . ) allowing the user UR to command and interact with the mobile device DV, and more particularly with the digital wallet application DWA.

Figure 4B:
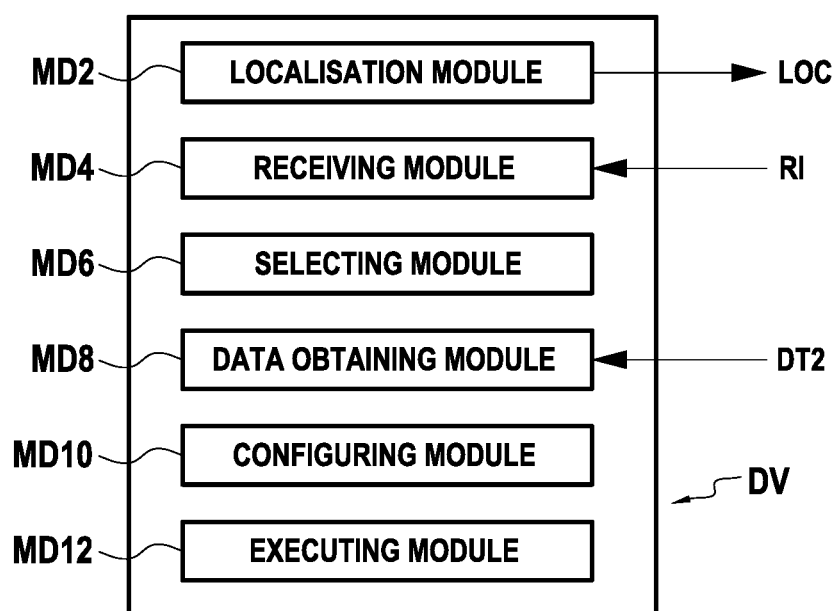
FIG. 4B shows functional modules implemented by the mobile device of FIG. 4A, in accordance with a particular embodiment of the present invention.

The processor 2, piloted by the computer program PG1, implements a number of functional modules as depicted in FIG. 4B, that is: a localisation module MD2, a receiving module MD4, a selecting module MD6, a data obtaining module MD8, a configuring module MD10 and an executing module MD12.

The sending module MD2 is configured to send an information request containing location information LOC representative of a mobile device's current position, as already described with respect to FIG. 3.

The receiving module MD4 is configured to receive, in response to the information request, roaming information RI identifying at least one roaming payment network R-NT (other than the home payment network H-NT) which is available in the current position of the mobile device DV, as already described with respect to FIG. 3.

The selecting module MD6 is configured to select a roaming payment network R-NT based on the received roaming information RI, as already described with respect to FIG. 3.

The data obtaining module MD8 is configured to obtain a second set of data DT2 allocated to the mobile payment card C1 for operating in the selected roaming network R-NT, as will be described below with respect to FIG. 6.

The configuring module MD10 is configured to configure the digital wallet application DWA with the second set of data DT2 so that it can use the mobile payment card C1 in the selected roaming payment network R-NT, as will be described below with respect to FIG. 6. The executing module MD12 is configured to perform a payment transaction (or any other appropriate banking transaction) using the mobile payment card C1 in the selected roaming payment network R-NT, as will be described below with respect to FIG. 7-10B.

These modules MD2-MD12 only constitute a non-limitative embodiment of the present invention.

Figure 5A:
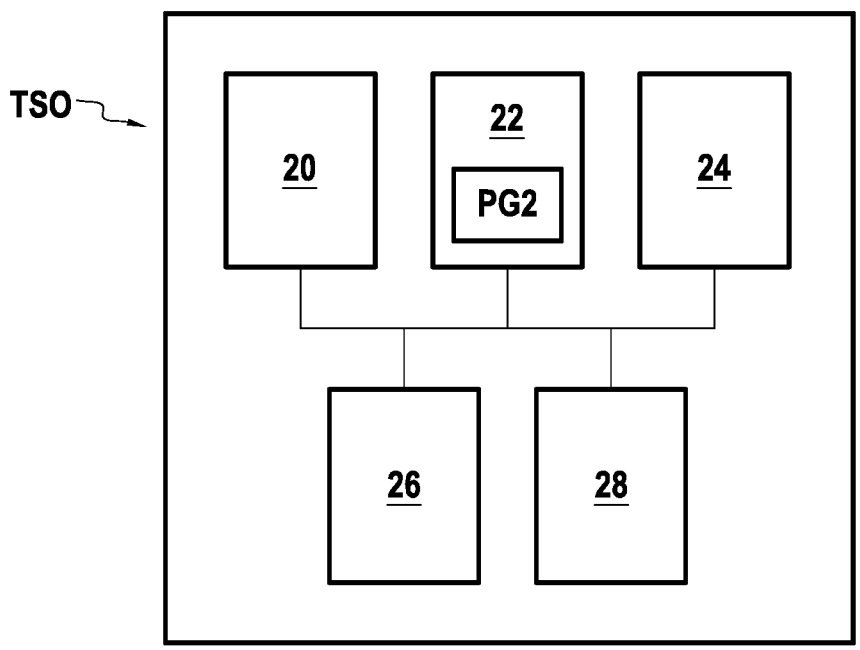
FIG. 5A shows the structure of a server of a token service operator in accordance with a particular embodiment of the present invention.

FIG. 5A shows, in accordance with a particular embodiment of the invention, the structure of the server TSO already described above. In this example, the server TSO presents the hardware architecture of a computer. In particular, the server TSO comprises a processor 20, a rewritable non-volatile memory 22 (e.g., a Flash), a RAM memory 24, a database 26 and a communication interface 28. Some elements typically included in a server have been voluntarily omitted in the present embodiment to enhance clarity of the present disclosure.

The rewritable non-volatile memory 22 of the server TSO constitutes a non-transitory recording medium in accordance with a particular embodiment of the invention. This memory includes a computer program PG2 according to a particular embodiment of the invention, this computer program comprising instructions to implement a method according to a particular embodiment of the invention.

The database 26 includes roaming payment network information defining a list of at least one selectable roaming payment network in association with a particular position (cellular network, geographical position . . . ). As described earlier with respect to FIG. 3, database 26 stores the identifiers ID1, ID2 and ID3 of three respective roaming payment networks, in association with a current position of the mobile device DV.

The interface 28 is a communication interface that is used by the server TSO to communicate with the digital wallet server DWP or, in a variant, directly with the mobile device DV over a cellular network.

Figure 5B:
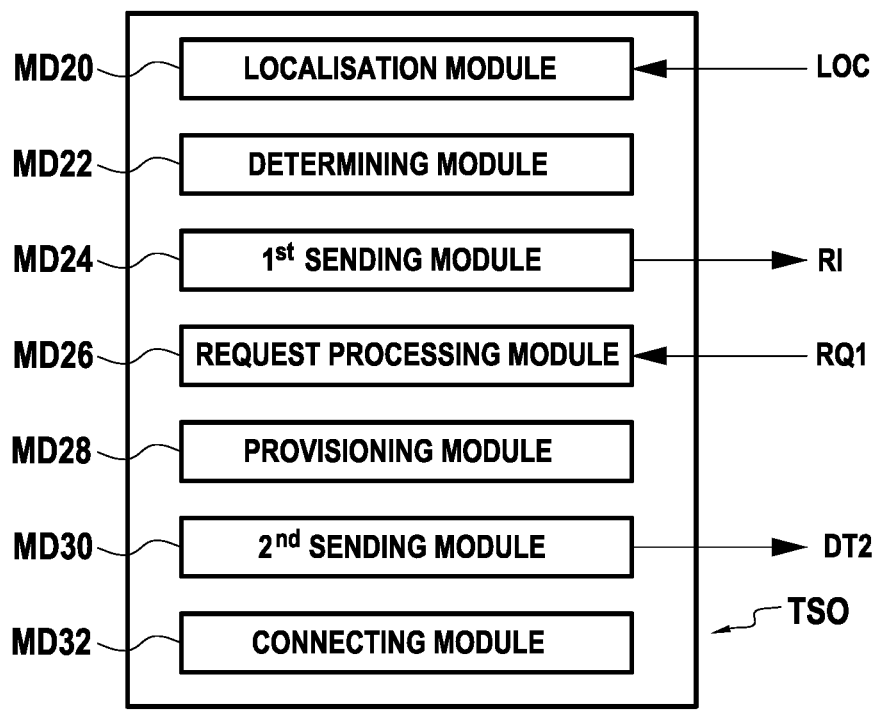
FIG. 5B shows functional modules implemented by the server of FIG. 5A, in accordance with a particular embodiment of the present invention.

The processor 20, piloted by the computer program PG2, implements a number of functional modules as depicted in FIG. 5B, that is: a localisation module MD20, a determining module MD22, a first sending module MD24, a request processing module MD26, a provisioning module MD28 and a second sending module MD30. In a particular example, the processor 20 further implements a connecting module MD32.

The localisation module MD20 is configured to receive, from the mobile device DV, an information request containing location information LOC representative of a mobile device DV's current position, as already described with respect to FIG. 3.

The determining module MD22 is configured to determine, based on the location information, at least one roaming payment network which may be accessed by the mobile device DV, as already described with respect to FIG. 3.

The first sending module MD24 is configured to send, to the mobile device DV, roaming information RI identifying the at least one roaming payment network determined by the determining module MD22, as already described with respect to FIG. 3.

The request processing module MD26 is configured to receive, from the mobile device DV, a provisioning request RQ1 for the roaming payment network R-NT selected by the mobile device DV among said at least one roaming payment network, as will be described in more detail later.

The provisioning module MD28 is configured to obtain a second set of data DT2 allocated to the mobile payment card C1 for operating in the selected roaming payment network R-NT, as will be described in more detail later.

The second sending module MD30 is configured to send the second set of data DT2 to the mobile device DV for configuring the digital wallet application DWA so that it can use the mobile payment card C1 in the selected roaming payment network R-NT.

Figure 8:
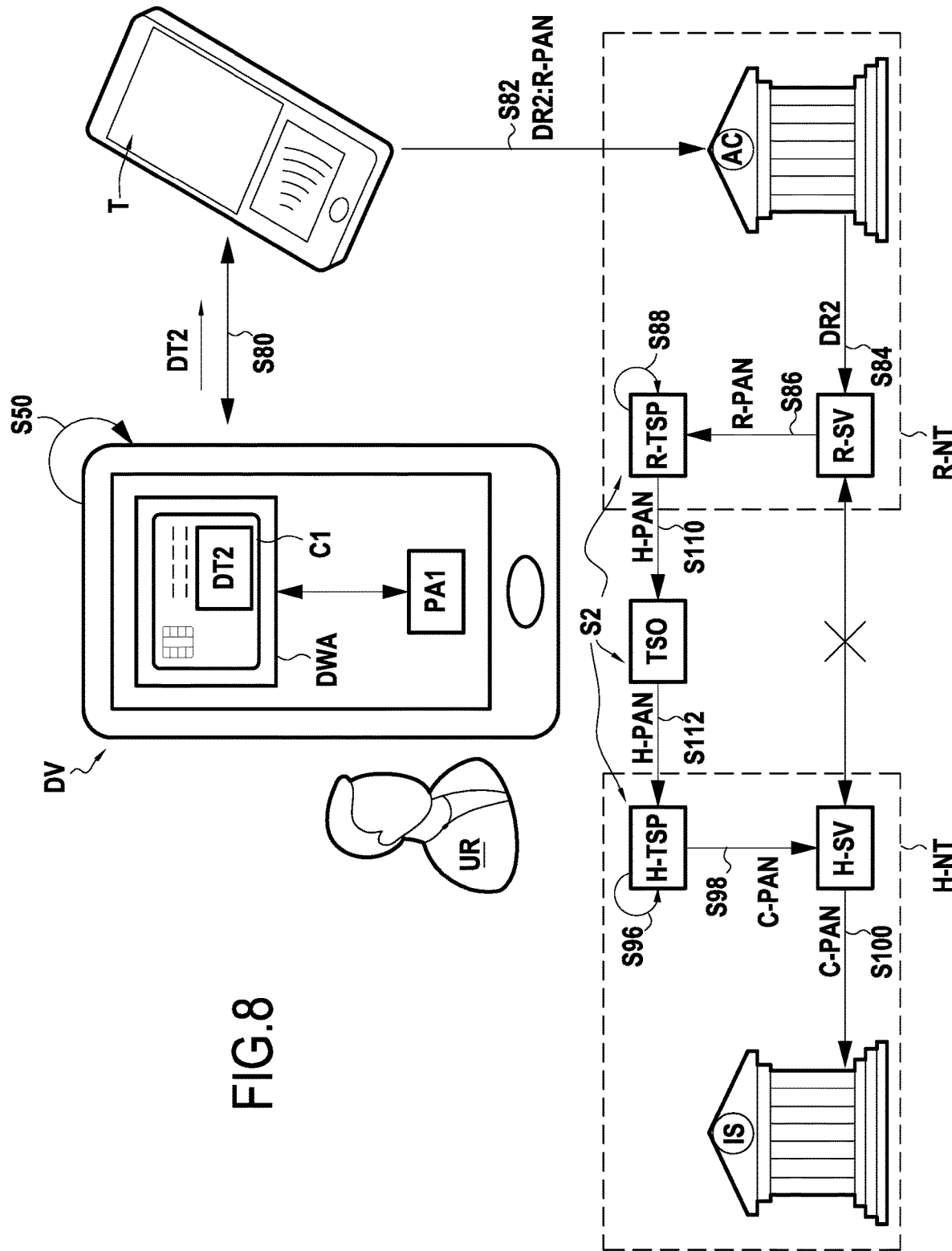
FIG. 8 is a schematic diagram representing an alternative embodiment of FIG. 7.

The connecting module MD32 is configured to connect with each other the home payment network H-NT and the selected roaming payment network R-NT while a payment transaction is being processed, as described in more detail in the particular example of FIG. 8.

These modules MD20-MD32 only constitute a non-limitative embodiment of the present invention.

In a particular embodiment, the invention can be implemented using software and/or hardware components. In this context, the term "module" can refer in this document to a software component, as well as a hardware component or a plurality of software and/or hardware components.

Once the selection step S50 as represented in FIG. 3 is completed, the digital wallet application DWA has identified the roaming payment network R-NT that is to be used at the current location of the mobile device DV. Data provisioning is then performed as represented in FIG. 6, in accordance with a particular embodiment of the invention.

More particularly, the digital wallet application DWA commands the mobile device DV to send (S60) a provisioning request RQ1 for the roaming payment network R-NT that was previously selected in S50. In the present embodiment, the provisioning request RQ1 is sent by the mobile device DV to the digital wallet server DWP which forwards (S62) it to the server TSO of the token service operator.

The provisioning request RQ1 transmitted via the digital wallet server DWP to the server TSO includes the identifier H-PANID which was previously stored as part of data DT1 by the mobile device DV in S10 (FIG. 1). As already mentioned, by using this identifier H-PANID, diffusion of the token H-PAN (which is a sensitive data) can be avoided.

In the present example, the provisioning request RQ1 also includes the identifier ID1 of the selected roaming payment network R-NT. Based on this identifier ID1, the server TSO detects that the roaming payment network is selected.

In a step S64, the server TSO determines a second set of data DT2, different from the first set of data DT1, allocated to the mobile payment card C1 for operating in the selected roaming payment network R-NT. A particular way for the server to obtain the data DT2 is now described although others embodiments are possible.

In a step S64a, the server TSO sends the identifier H-PANID, extracted from the provisioning request RQ1, to the server H-TSP of the home service provider. The server H-TSP then determines (S64b) the home token H-PAN corresponding to the identifier H-PANID. As already explained with respect to FIG. 1 (step S5), the server H-TSP may retrieve information including the couple [H-PAN, H-PANID] for the mobile payment card C1.

In a step S64c, the server H-TSP returns the corresponding home token H-PAN to the server TSO, which then forwards (S64d) it to a server R-TSP of a roaming token service provider. In a particular example, the server TSO determines the server R-TSP to which the home token H-PAN is to be sent based on the selected roaming payment network R-NT identified as such in the provisioning request RQ1. The server TSO may for instance access a list wherein the server R-TSP is defined in association with the identifier ID1 of the roaming payment network R-NT.

In a step S64e, the server R-TSP determines, based on the received home token H-PAN, the second set of data DT2 which is to be provisioned to the digital wallet application DWA. In addition, the server stores (S64e) the received home token H-PAN in association with the second set of data DT2.

The server R-TSP returns back (S64d) the second set of data DT2 to the server TSO which then forwards (S62) it to the digital wallet server DWP. The second set of data DT2 is finally transmitted (S68) by the digital wallet server DWP to the mobile device DV.

This second set of data DT2, different from the first set DT1, is allocated to the mobile payment card to operate in the selected roaming payment network R-NT. To this end, the data DT2 includes a roaming token R-PAN and may also include a corresponding identifier R-PANID. The roaming token R-PAN, which may take any appropriate digital form (such as a code, a sequence of characters etc.), is a less sensitive data than the payment card's account number C-PAN. The roaming token R-PAN can be used by the digital wallet application DWA instead of the account number C-PAN, thereby allowing for a more secure payment system.

In a step S70, the mobile device DV configures the digital wallet application DWA with the received second set of data DT2 for enabling it to perform payment transactions in the selected roaming payment network R-NT. In step S70, the mobile device DV stores for instance the second set of data DT2 in its memory 4 (FIG. 4A).

As part of this configuration S70, the mobile device DV may personalise the visual aspect of the graphical user interface (GUI) of the digital wallet application DWA with visual parameters R-PRM which may also be included in the second set of data DT2 provisioned by the server TSO. As a result, the visual configuration (e.g., card picture, logo and/or colours) of the GUI of the digital wallet application DWA can be adapted to reflect the roaming payment system that is used. The user UR may then easily realise that his digital wallet application DWA is configured in a roaming operation mode. In other words, the visual parameters R-PRM are for configuring the visual appearance of the digital wallet application DWA to indicate that the mobile payment card C1 is used in the selected roaming banking device.

In a particular example, the second set of data DT2 may comprise a roaming payment application (other than AP1) to be installed in the mobile device DV for cooperating (interacting) with the digital wallet application DWA when the mobile payment card C1 is used in the roaming payment network R-NT. Accordingly, as part of the configuration S70, the mobile device DV may install the roaming payment application for allowing adequate processing of a payment transaction while roaming in the roaming payment network.

Once this configuration S70 is completed, the user UR is able to use the digital wallet application DWA run on the mobile device DV to complete a payment transaction in the roaming payment network R-NT. To this end, the user UR may present the mobile device DV near a payment terminal T of a merchant, as shown in FIG. 6. The mobile device DV may cooperate (S80) with the payment terminal T in any appropriate manner to perform a mobile payment. In particular, the mobile device DV transmits the second set of data DT2, or at least the roaming token R-PAN, so that the transaction can be authenticated by the terminal T. As mentioned earlier, transmission of sensitive data such as the account number C-PAN can thus be avoided.

Figure 11:
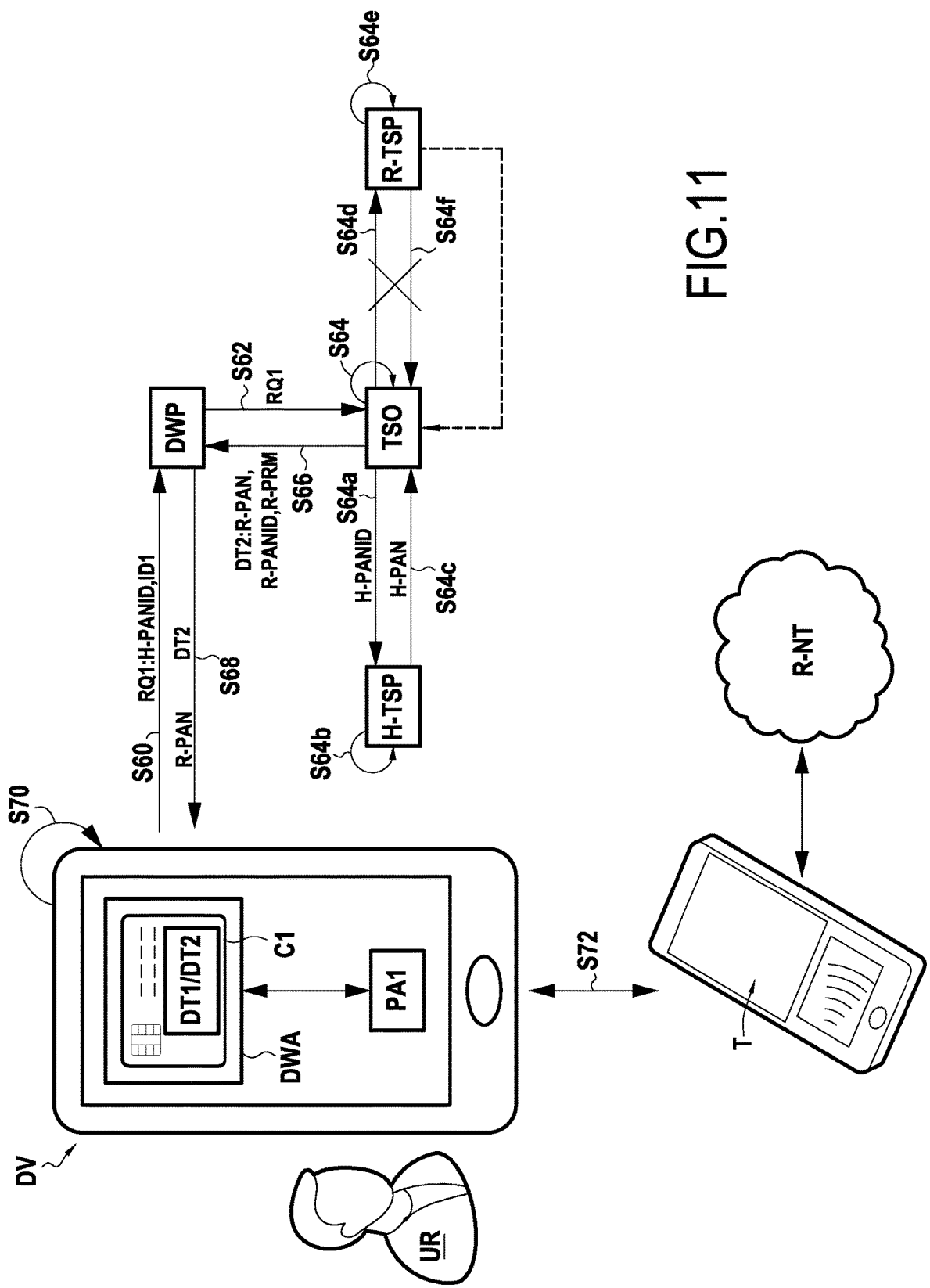
FIGS. 11-15 are schematic diagrams representing particular embodiments of the present invention.

FIG. 11 depicts a variant of the particular embodiment described above with reference to FIG. 6. The variant of FIG. 11 differs from FIG. 6 in that, when the server TSO receives in S64c the home token H-PAN, it has already acquired and stored the corresponding second set of data DT2. A token service provider may for instance provide in advance the server TSO with a set of data including the second set of data (roaming token R-PAN . . . ). This set of data DT2 is then stored in a memory of the server TSO and retrieved by the server TSO once the H-PAN is received (S64c) from the server H-TSP. In other words, the server TSO and the server R-TSP form one and same server (the server TSO plays the role of server R-TSP). There is thus no need for the server TSO to interrogate the remote server R-TSP as depicted in FIG. 6 (S64d, S64f).

Figure 6:
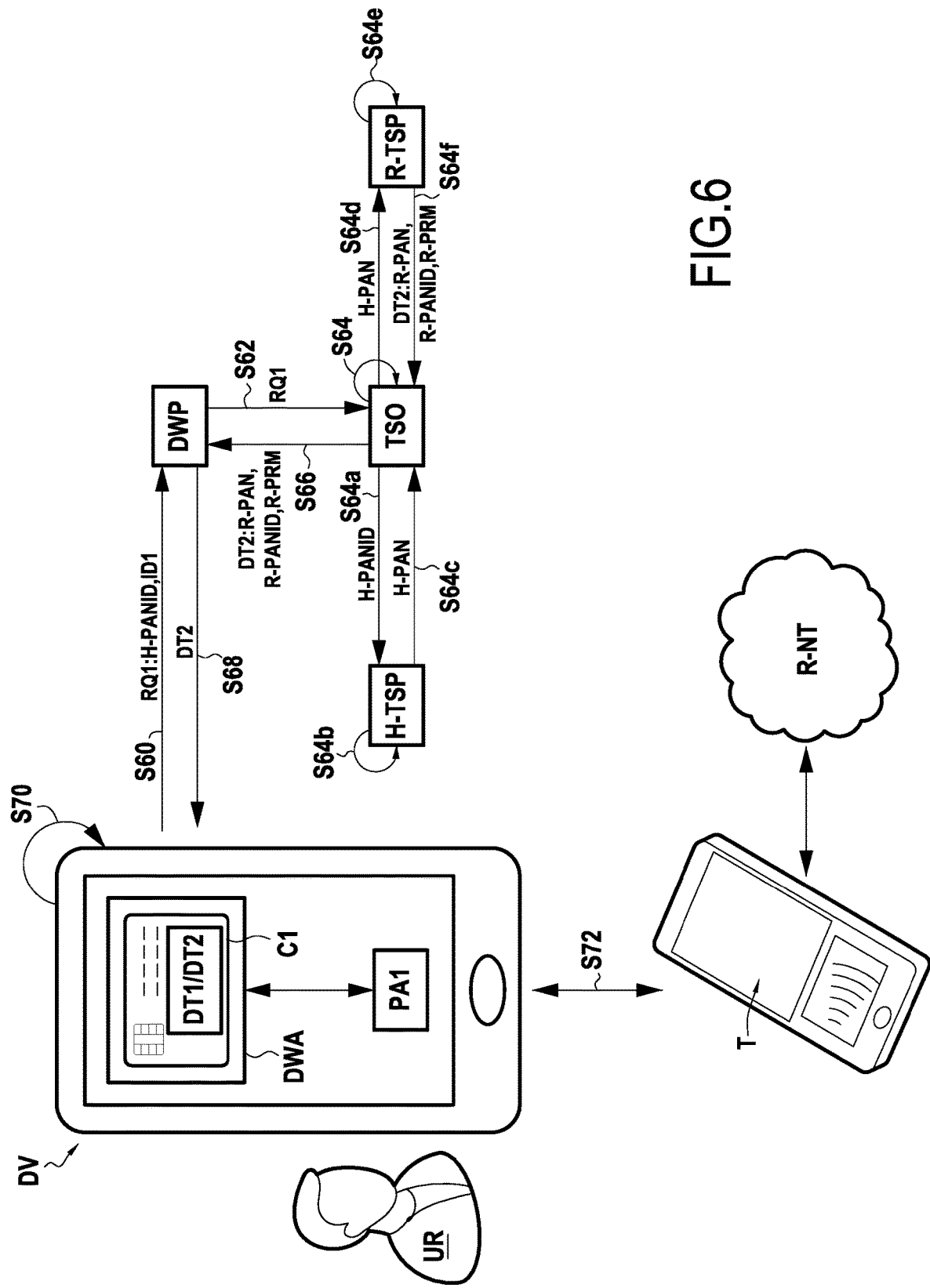
FIG. 6 is a schematic diagram representing the structure of, and steps performed by, an environment comprising a mobile device and a server of a token service operator, in accordance with a particular embodiment of the present invention.
Figure 7:
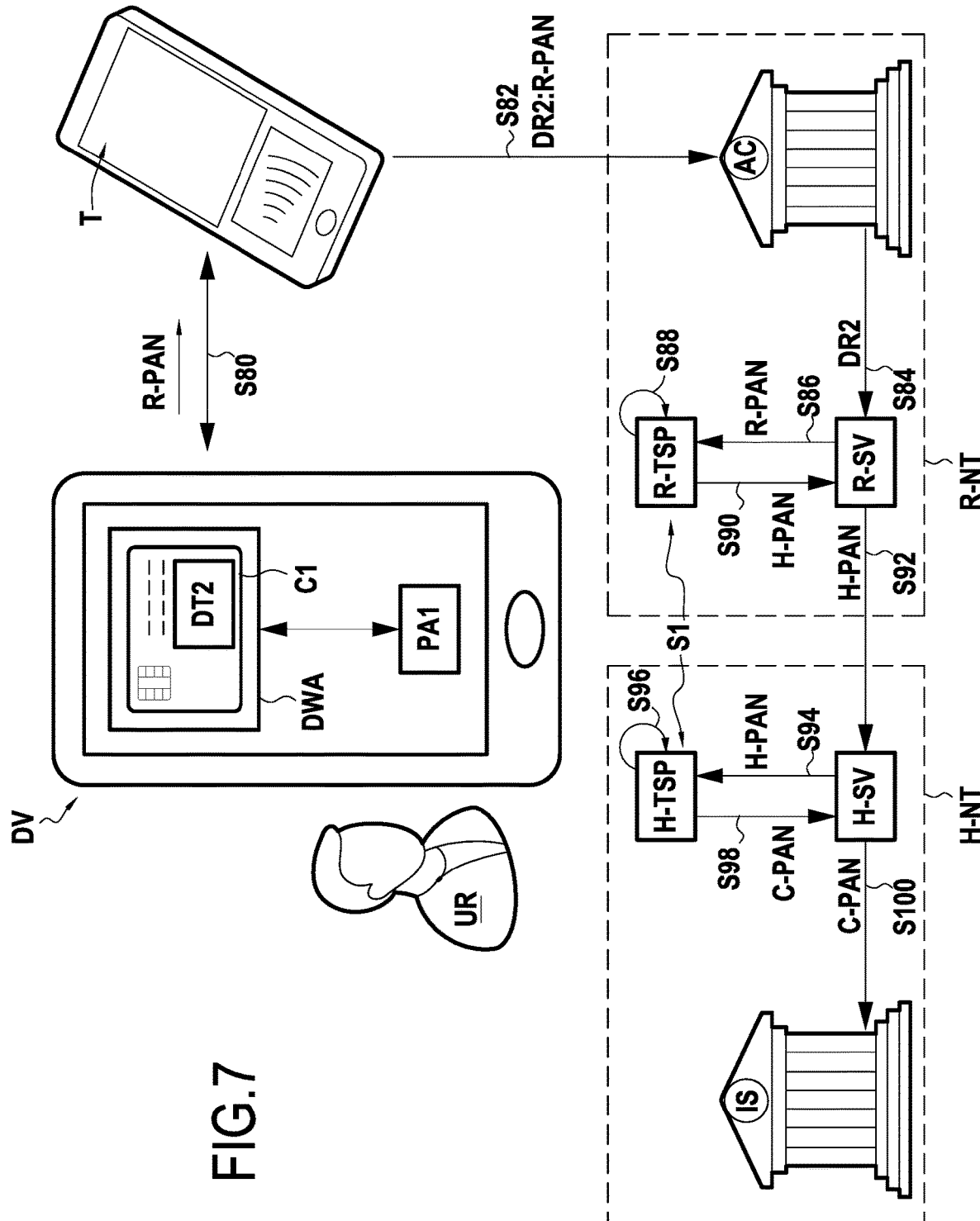
FIG. 7 is a schematic diagram representing the structure of, and steps performed by, an environment comprising a mobile device carrying out a transaction, in accordance with a particular embodiment of the present invention.

FIG. 7 depicts, in accordance with a particular embodiment of the invention, how a payment transaction can be performed by the mobile device DV using the mobile payment card C1 in the roaming payment network R-NT, once the configuration S70 (FIG. 6) with the data DT2 is completed.

In step S80, as already described with respect to FIG. 6, the mobile device DV sends the roaming token R-PAN to the payment terminal T. Other information included in the second set of data DT2, such as the expiring date of the payment card C1, can be transmitted along to the terminal T.

The interaction S80 between the mobile device DV and the payment terminal T may proceed in an analogous manner as the interaction S12 described with respect to FIG. 1. In a particular example, the mobile device DV and the payment terminal T cooperate with each other according to the EMV standard to perform the payment transaction. This can be made through a contactless communication between the mobile device DV and the terminal T, using for instance NFC interfaces or the like (Bluetooth, QR Code . . . ).

During this interaction S80, the digital wallet application DWA may interact with the payment application PA1 deployed by the issuing bank of the payment mobile card C1 or with another payment application (not shown), so-called roaming payment application, implemented in the mobile device DV and destined to be used for transactions in the roaming payment network R-NT.

The payment terminal T, positioned for instance in a point of sale of a merchant, then transmits (S82) transaction data DR2 to the bank system AC of the acquirer (e.g., the merchant's bank). The transaction data DR2 contains any data (date, transaction amount . . . ) characterising the payment transaction for allowing further processing such as authentication, validation . . . . In particular, the transaction data DR2 includes the roaming token R-PAN provided by the digital wallet application DWA of the mobile device DV.

In a step S84, the bank system AC of the acquirer transmits the transaction data DR2 to a routing server R-SV of the roaming payment network R-NT. This server R-SV forwards (S86) the roaming token R-PAN to the server R-TSP of the roaming token service provider (as already shown in FIG. 6). In this example, the bank system AC of the acquirer, the servers R-SV and the server R-TSP are part of the roaming payment network R-NT.

In a first detokenization step S88, the server R-TSP obtains (or determines), based on the roaming token R-PAN, the home token H-PAN allocated to the mobile payment card C1 for operating in the home payment network H-NT (different from the roaming payment network R-NT). To this end, the server R-TSP may retrieve the home token H-PAN from the information previously stored in association with the roaming token R-PAN in step S64e (FIG. 6).

The server R-TSP returns (S90) the home token H-PAN to the server R-SV which forwards (S92) it, as part of a transaction request, to a server H-SV of the home payment network. In the present embodiment, this is possible because the home payment network H-NT and the roaming payment network R-NT are connected via a host-to-host (or server-to-server) connection. This host-to-host connection means that there is a direct connection between the two servers R-SV and H-SV. No intermediary network or switch is positioned between the servers R-SV and H-SV to ensure communication.

The server H-SV forwards (S94) the roaming token H-PAN to the server H-TSP of the home token service provider (as already shown in FIG. 6).

In a second detokenization step S96, the server H-TSP obtains (or determines), based on the home token H-PAN, the PAN number C-PAN of the mobile payment card C1 allocated by the bank issuer. To this end, the server H-TSP may retrieve the primary account number C-PAN from the information previously stored in association with the home token H-PAN in step S5 (FIG. 1).

The server H-TSP returns (S98) the account number C-PAN to the server H-SV which forwards (S100) it to the bank system IS of the issuer as part of a transaction request, along with any other useful information that may have been received in the transaction data DR2 (amount, date . . . ). As already mentioned with respect to FIG. 2, the issuer IS may be, for instance, the issuing bank of the mobile payment card C1.

The issuer IS may then process the payment transaction based on the account number C-PAN allocated to the mobile payment card C1 to operate with the home payment network H-NT.

In this example, the bank system IS of the issuer, the servers H-SV and the server H-TSP are part of the home payment network R-NT.

The servers H-TSP and R-TSP form together a token managing system 51 which is configured to perform a double detokenization, i.e. the first detokenization S88 (R-PAN converted into H-PAN) and the second detokenization S96 (H-PAN converted into C-PAN).

Thanks to this double detokenization process, interoperability can be achieved between different payment systems while ensuring that the payment transactions are performed securely.

FIG. 8 depicts, in accordance with another embodiment of the invention, how a payment transaction can be performed by the mobile device DV using the mobile payment card C1 in the roaming payment network R-NT, once the configuration S70 (FIG. 6) with the data DT2 is completed.

The transaction process is performed in substance as shown in FIG. 7, except that it is assumed that no host-to-host communication can be achieved between the roaming payment network R-NT and the home payment network H-NT in this case. This embodiment thus differs from the example of FIG. 7 in that the server TSO as already mentioned earlier (FIGS. 5A and 5B) is used as a routing interface between the roaming payment network R-NT and the home payment network H-NT during the transaction process.

As shown in FIG. 8, once the home token determination S88 is completed, the server R-TSP sends (S110) the home token H-PAN to the server TSO in a transaction request. The server TSO routes (S112) the transaction request including the home token H-PAN from the server R-TSP to the server H-TSP.

The server H-TSP determines the primary account number C-PAN in step S96 and the transaction processing proceeds further in the same manner as in the embodiment of FIG. 7.

The servers H-TSP, the server TSO and the server R-TSP form together a token managing system S2 which is configured to perform a double detokenization, i.e. the first detokenization S88 (R-PAN converted into H-PAN) and the second detokenization S96 (H-PAN converted into C-PAN).

It should be noted that the routing S112 of the home token H-PAN to the server H-TSP may be performed by a server which is not in charge of providing the roaming information RI to the mobile device DV (steps S42-S46, FIG. 3) or of provisioning the set of data DT2 (steps S62-S66, FIG. 6) at the first place. In a variant, the routing S112 shown in FIG. 8 is performed by any appropriate server other that the server TSO previously described.

Figure 9A:
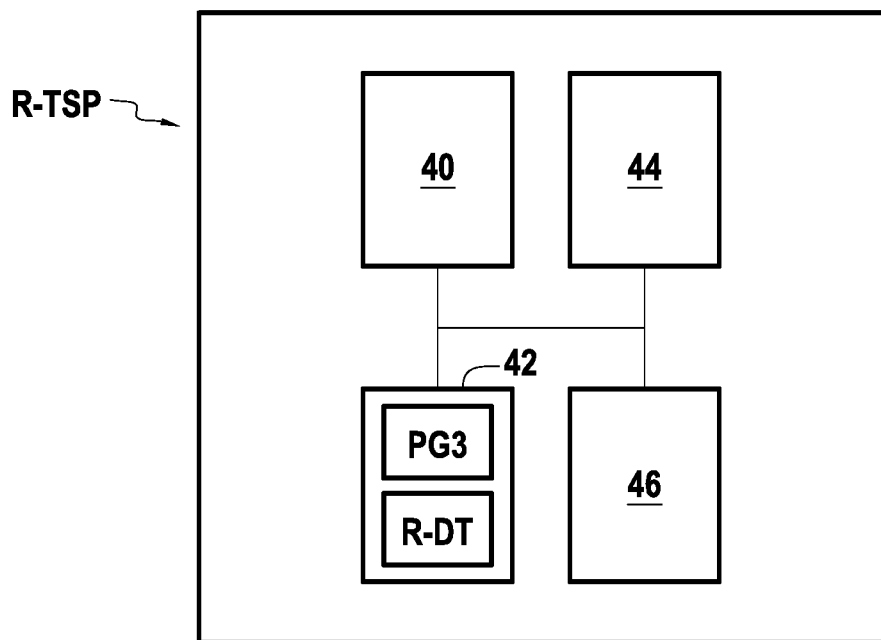
FIG. 9A shows the structure of a server of a roaming token service provider in accordance with a particular embodiment of the present invention.

FIG. 9A shows, in accordance with a particular embodiment of the invention, the structure of the server R-TSP as already described above. In this example, the server R-TSP presents the hardware architecture of a computer. In particular, the server R-TSP comprises a processor 40, a rewritable non-volatile memory 42 (e.g., a Flash), a RAM memory 44 and a communication interface 46. Some elements typically included in a server have been voluntarily omitted in the present embodiment to enhance clarity of the present disclosure.

The rewritable non-volatile memory 42 of the server R-TSP constitutes a non-transitory recording medium in accordance with a particular embodiment of the invention. This memory includes a computer program PG3 according to a particular embodiment of the invention, this computer program comprising instructions to implement a method according to a particular embodiment of the invention as already described with reference to FIGS. 7 and 8.

The rewritable non-volatile memory 42 may also store data R-DT comprising the home token H-PAN in association with the roaming token R-PAN of the mobile payment card C1 (as already described with reference to FIG. 6).

The communication interface 46 enables the server R-TSP to communicate within the roaming payment network R-NT and, in the particular case of FIG. 8, with the server TSO.

Figure 9B:
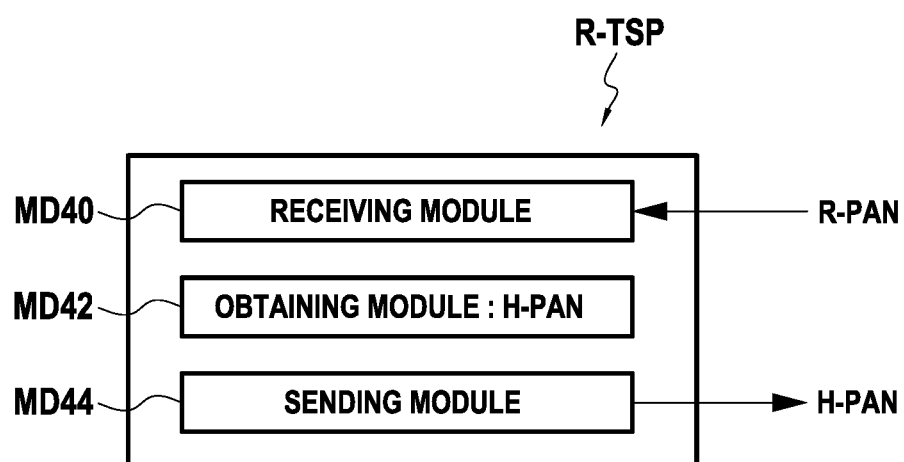
FIG. 9B shows functional modules implemented by the server of FIG. 9A, in accordance with a particular embodiment of the present invention.

The processor 40, piloted by the computer program PG3, implements a number of functional modules as depicted in FIG. 9B, that is: a receiving module MD40, an obtaining module MD42 and a sending module MD44.

The receiving module MD40 is configured to receive the roaming token R-PAN allocated to the mobile payment card C1 for operating in the roaming payment network R-NT, as already described with respect to FIGS. 7 and 8.

The obtaining module MD42 is configured to determine, based on the roaming token R-PAN, the corresponding home token H-PAN allocated to the mobile payment card C1 for operating in the home payment network H-NT which is different from the roaming payment network R-NT. To this end, the obtaining module MD42 consults the stored data R-DT.

The sending module MD44 is configured to send the home token H-PAN either to the server R-SV (FIG. 7) or to the server TSO (FIG. 8).

Figure 10A:
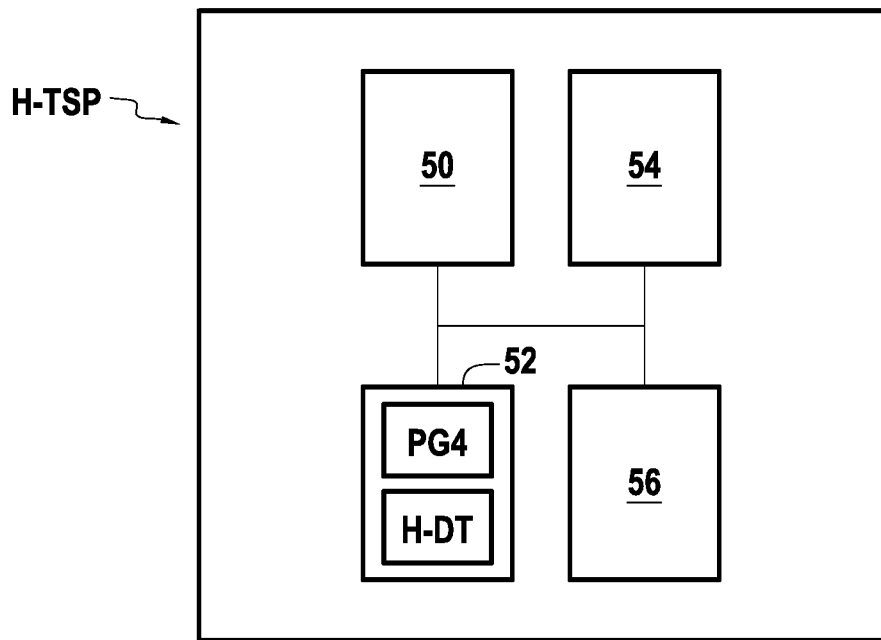
FIG. 10A shows the structure of a server of a home token service provider in accordance with a particular embodiment of the present invention.

FIG. 10A shows, in accordance with a particular embodiment of the invention, the structure of the server H-TSP as already described above with respect to FIGS. 7-8. In this example, the server H-TSP presents the hardware architecture of a computer. In particular, the server H-TSP comprises a processor 50, a rewritable non-volatile memory 52 (e.g., a Flash), a RAM memory 54 and a communication interface 56. Some elements typically included in a server have been voluntarily omitted in the present embodiment to enhance clarity of the present disclosure.

The rewritable non-volatile memory 52 of the server H-TSP constitutes a non-transitory recording medium in accordance with a particular embodiment of the invention. This memory includes a computer program PG4 according to a particular embodiment of the invention, this computer program comprising instructions to implement a method according to a particular embodiment of the invention as already described with reference to FIGS. 7 and 8.

The rewritable non-volatile memory 52 may also store data H-DT comprising the account number C-PAN in association with the home token H-PAN of the mobile payment card C1 (as already described with reference to FIG. 6).

The communication interface 56 enables the server H-TSP to communicate within the home payment network R-NT and, in the particular case of FIG. 8, with the server TSO.

Figure 10B:
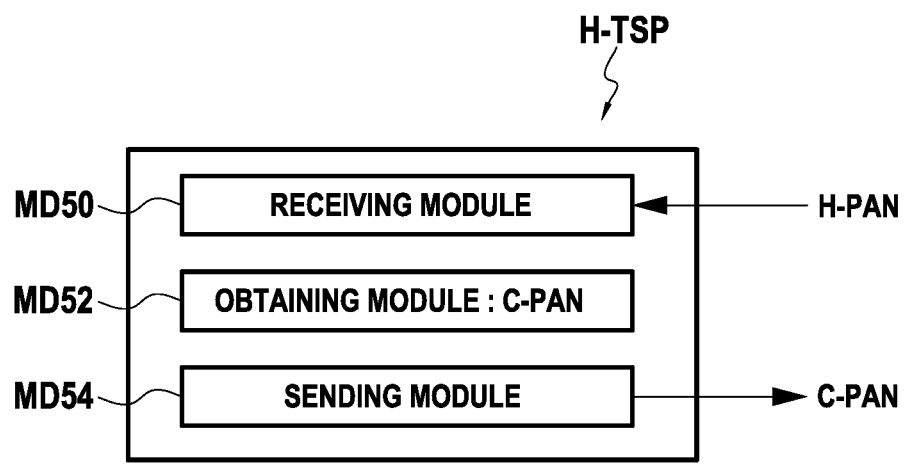
FIG. 10B shows functional modules implemented by the server of FIG. 10A, in accordance with a particular embodiment of the present invention.

The processor 50, piloted by the computer program PG4, implements a number of functional modules as depicted in FIG. 10B, that is: a receiving module MD50, an obtaining module MD52 and a sending module MD54.

The receiving module MD50 is configured to receive the home token H-PAN allocated to the mobile payment card C1 for operating in the home payment network H-NT, as already described with respect to FIGS. 7 and 8.

The obtaining module MD52 is configured to determine, based on the home token H-PAN, the corresponding PAN, so-called C-PAN, allocated to the mobile payment card C1 for operating in the home payment network H-NT. To this end, the obtaining module MD52 consults the stored data H-DT.

The sending module MD54 is configured to send the account number C-PAN to the system of the bank issuer IS.

The present invention provides for an efficient roaming mobile payment solution. In particular, instead of using a single global payment network, the invention allows efficient interoperability of mobile payment cards with multiple payment networks that a user may access using his/her mobile device.

As mentioned earlier, a user roaming in different areas (e.g., changing countries) may happen to be out of reach of a national payment network his/her mobile payment card is configured to operate with. Additionally, a user may not wish or be able to use an international payment network. The invention allows configuring a digital wallet application so that it can use a mobile payment card while in a situation of roaming in a given roaming payment network. Thanks to the invention, it is possible to dynamically adapt the configuration of a digital wallet application so that transactions can be made in a roaming payment system, such as a local or national payment network.

The invention obviates the need for a global (international) payment network. Instead of using global payment networks, when a user is roaming outside his national (or regional) payment network, a mobile bank transaction may be advantageously performed in another national (or regional) payment network. The invention can ensure adequate interoperability between distinct payment systems having different specifications, such that using an international payment network is no longer required. Domestic banking schemes can get international acceptance via roaming agreements with other banking schemes. Standard co-badge bi-lateral contacts and host-to-host integrations can for instance be signed.

Thanks to the invention, a mobile device may automatically configure a digital wallet application depending on the mobile device's position. The parameters and visual aspects (logo, appearance . . . ) of the digital wallet application may be adapted accordingly to inform the user of the roaming re-configuration. In particular, the card picture, logo and/or colours may be adapted as needed.

Interoperability is ensured between scheme partners while an adequate level of security can be maintained in the transaction process. By performing a double detokenization during the transaction, the invention allows each payment system to use its tokens in an efficient manner.

The invention overcomes the problems and drawbacks mentioned earlier and this without the burden of conceiving and deploying a worldwide standardised payment system.

The digital wallet application may contain and manage a plurality of mobile payment cards and allow each of these cards to be used in a roaming payment network in accordance with the present invention. A specific payment application may be implemented in the mobile device for each mobile payment card present in the digital wallet.

Particular variants of the embodiments shown in FIGS. 7 and 8 are now described with reference to FIGS. 12-15.

Figure 12:
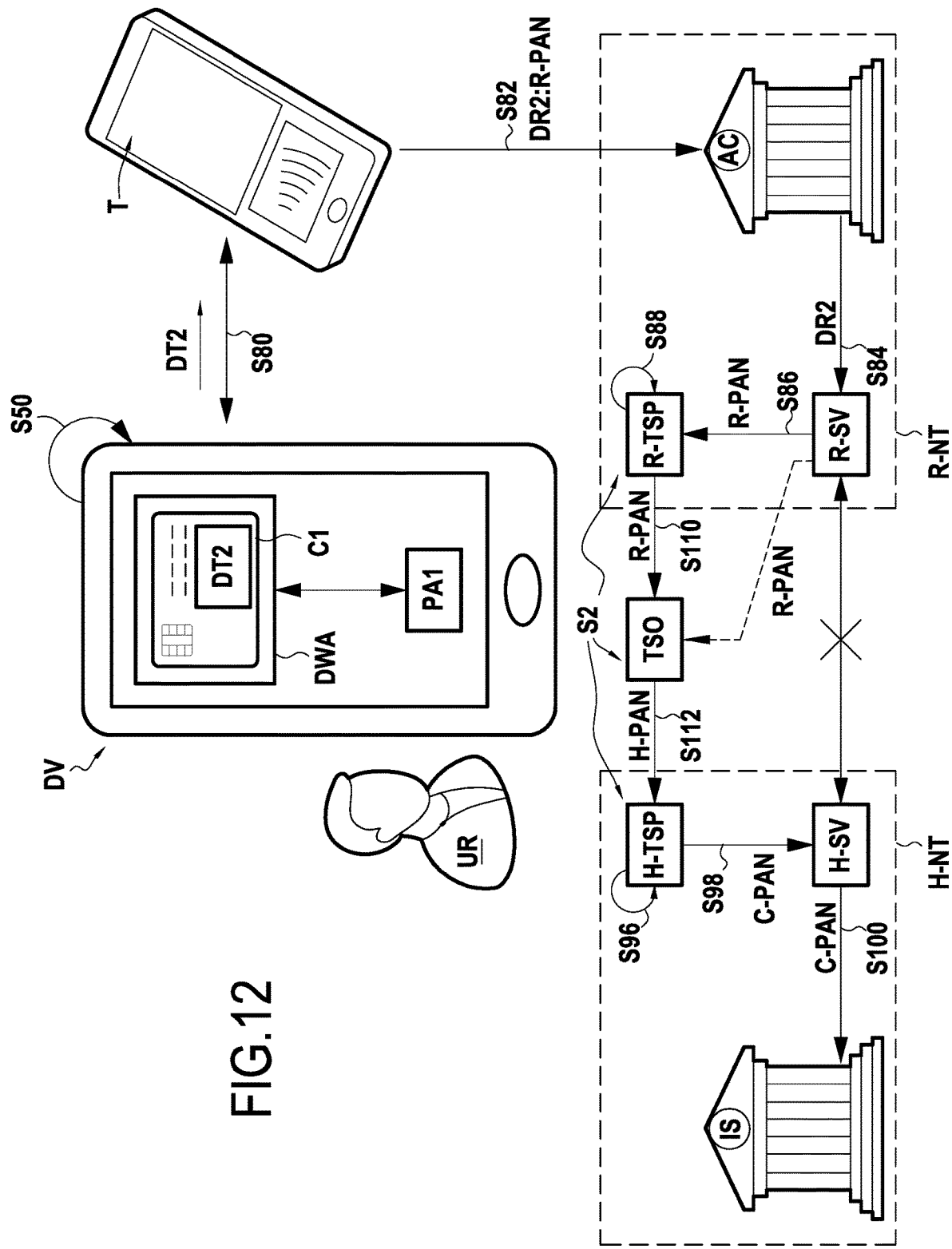

More particularly, FIG. 12 represents a variant which differs from the embodiment of FIG. 8 in that it is the server TSO which performs the first detokenization by obtaining the home token H-PAN based on the roaming token. This is possible because the server has previously stored the home token H-PAN in association with roaming token R-PAN, as described for instance in the variant shown in FIG. 11. In the variant shown in FIG. 12, the server R-TSP thus does not perform the first detokenization step S88 and transmits in S110 the roaming token R-PAN to the server TSO. It is the server TSO which converts the roaming token R-PAN into the corresponding home token H-PAN and transmits this H-PAN in S112 to the server H-TSP.

In another variant, the server R-SV transmits the roaming token R-PAN in S86 directly to the server TSO. In this case, there is thus no need for the server R-TSP to transmit the roaming token R-PAN from the server R-SV to the server TSO.

As can be understood from the embodiments described above, the double-detokenization process may thus be performed in various servers or other entities.

Figure 13:
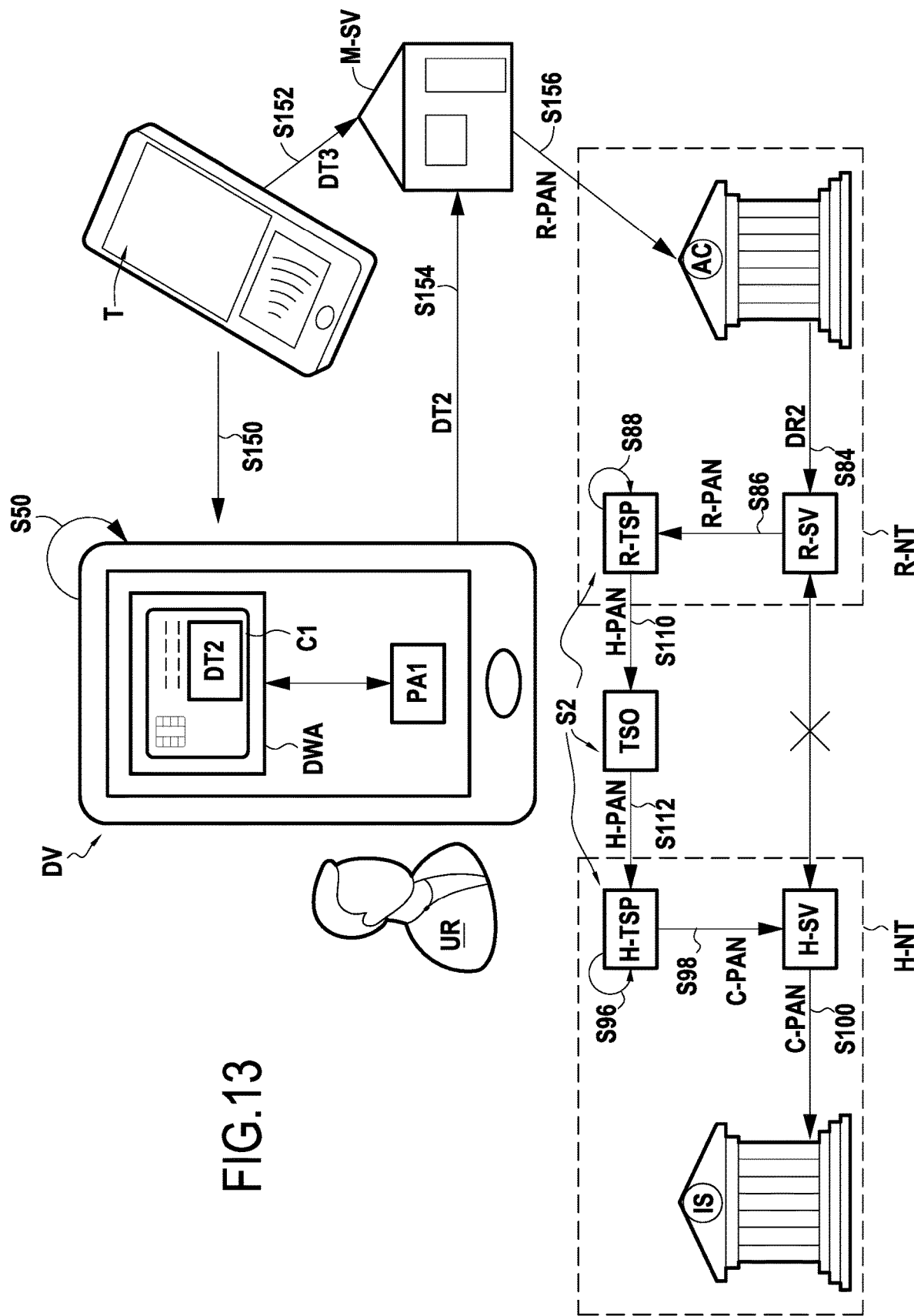

FIG. 13 represents a variant which differs from the previous embodiments of FIGS. 8, 9 and 12 in that the payment terminal T (in a point of sale, for instance) has not the capacity to communicate bilaterally with the user device DV. In this variant, when the user UR and a merchant wish to initiate a payment transaction, the merchant configures the payment terminal T so that it displays on a screen a graphic code, such as a QR code (or bar code) for instance. The user UR positions his mobile device DV facing the payment terminal and the mobile device DV acquires or reads (S150) the QR code using a camera (not shown) of the mobile device DV (scan & pay process). The mobile device DV then determines, based on the QR code, the set of data DT2 as previously described in the previous embodiments, and transmits (S154) this set of data DT2 to a server M-SV of the merchant. The set of data DT2 comprises the roaming token R-PAN and information on the transaction (transaction identifier, amount . . . ). Based on the QR code, the mobile device DV may also determine the address of the server M-SV to which the set of data DT2 is to be transmitted.

In parallel, the payment terminal also transmits (S152) transaction data DT3 comprising for instance the transaction identifier and the transaction amount. The server M-SV of the merchant then checks that the set of data DT2 received from the mobile device DV and the transaction data DT3 received from the payment terminal T match and, if there is a match, the merchant server M-SV transmits (S156) the set of data DT2 to the bank system AC of the acquirer for further processing as described in the other embodiments.

As can be understood from the embodiment of FIG. 13, a scan & pay process may thus be applied to the concept of the present invention which is based on double-tokenization and double-detokenization.

Figure 14:
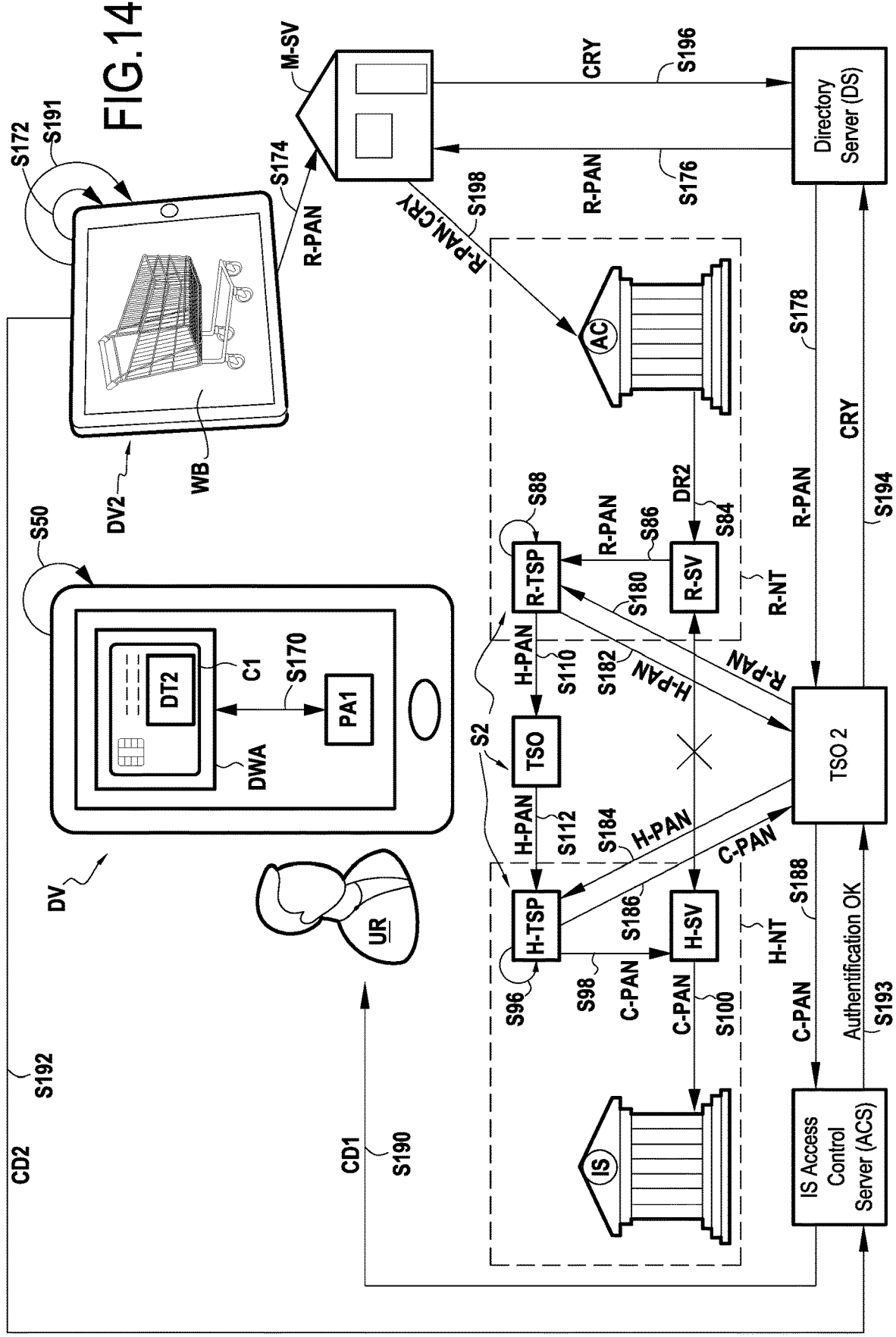

FIG. 14 represents a variant which differs from the previous embodiments in that a 3-D Secure (3DS) authentication process is performed to authenticate a user UR who wishes to perform an online payment transaction.

3-D Secure is a well-known XML-based protocol designed as an additional security layer for online payment transactions.

In the variant of FIG. 14, it is assumed that the user UR carries his first mobile device DV for accessing his digital wallet application DWA and wishes to perform an online payment transaction on a merchant's website WB. To this end, the user uses a second device DV2 for accessing the merchant's website WB. The second device DV2 may be of any appropriate type (PC, tablet . . . ) and may be the same as the first device DV1 or different from the first device DV1.

An authentication phase is first performed in accordance with the IDS protocol to authenticate the user UR prior to validating the payment transaction.

In a step S170, the user UR configures his mobile device DV so that it displays the roaming token R-PAN that was previously allocated to the user (as described earlier) to perform roaming payments in the roaming payment network R-NT. The user UR then uses his second device DV2 to enter (S172), on the merchant's website WB, card data allocated to the mobile payment card C1 for operating in the roaming payment network R-NT, this card data including the roaming token R-PAN, the expiry date and the card verification value CW of the mobile card C1. In a step S174, the second device DV2 transmits the card data including the roaming token R-PAN to a server M-SV of the merchant managing the website WB.

This server M-SV transmits (S176) the roaming token R-PAN to a directory server DS which then transmits (S178) it to a server TSO2 of a token service provider. The server TSO2 may be the same as the server TSO or a different one.

In a step S180, the server TSO2 transmits the roaming token R-PAN to the server R-TSP which performs a first detokenization to obtain the home token H-PAN based on R-PAN. The server R-TSP then transmits (S182) the home token H-PAN resulting from this first detokenization back to the server TSO2. In a step S184, the server TSO2 transmits the home token H-PAN to the server H-TSP which performs a second detokenization to obtain the corresponding PAN number C-PAN of the mobile payment card C1 based on the home token H-PAN. The server H-TSP then transmits (S186) the PAN number C-PAN back to the server TSO2. A double detokenization is thus performed by the servers R-TSP and H-TSP to obtain the PAN number C-PAN of card C1 based on the roaming token R-PAN.

In a step S188, the server TSO2 forwards the PAN number C-PAN to an IS Access Control (ACS) server, noted server ACS. Based on the PAN number C-PAN, the server ACS determines the contact information associated with the user UR. In this example, the servers ACS determines a phone number stored in association with the C-PAN of the mobile payment card C1. In a step S190, the server ACS transmits a 3DS code CS1 (a sequence of numbers for instance) to the user UR. In this example, the UR receives the code CD1 on his mobile device DV (e.g. a smartphone).

The user UR may then enter (S191) the 3DS code, noted CD2, on the website WB using his second device DV2. Once it is received, the second device DV2 transmits (S192) the 3DS code CD2 to the server ACS by any appropriate communication means. Other embodiments are however possible to provide the server ACS with the 3SD code CD2. According to another embodiment, in step S190, a mobile application in the mobile device DV may receive an authentication request from the server ACS. The user UR may use this mobile application to authenticate himself in S191 by entering the 3DS code received in S190. The mobile application in the mobile device DV may then forwards in S192 the 3DS code to the server ACS to confirm authentication.

The server ACS then checks whether the 3DS code CD2 entered by the user UR on the device DV2 matches the original code CD1 that was previously provided by the server ACS in step S190. In case there is a match, the server ACS transmits (S193) a notification to the server TSO2, indicating that the authentication is successful. In response thereto, the server TSO2 generates a cryptogram CRY, called an authentication verification cryptogram, and transmits (S194) it to the directory server DS which forwards (S196) it to the server M-SV. In a step S198, the server M-SV transmits the cryptogram CRY and the transaction data including the roaming token R-PAN to the bank system AC of the acquirer for proceeding with the payment transaction.

As already described with reference to the previous embodiments, a double detokenization is then performed again to validate the payment transaction. The bank system IS of the issuer authorizes the payment transaction only if it receives the cryptogram CRY indicating that the user UR has been authenticated.

As can be understood from this embodiment, the 3DS authentication process may thus be applied to the concept of the present invention which is based on double-tokenization and double-detokenization.

Neither merchants nor payment card issuers are usually required to support 3DS for online transactions. In case either the merchant and/or the issuer does not support 3DS, then the second device DV2 may in step S174 transmit directly the transaction data, including the roaming token R-PAN, to the bank system AC of the acquirer for proceeding with the payment transaction. The steps S176 to S198 (FIG. 14) are thus not performed.

Figure 15:
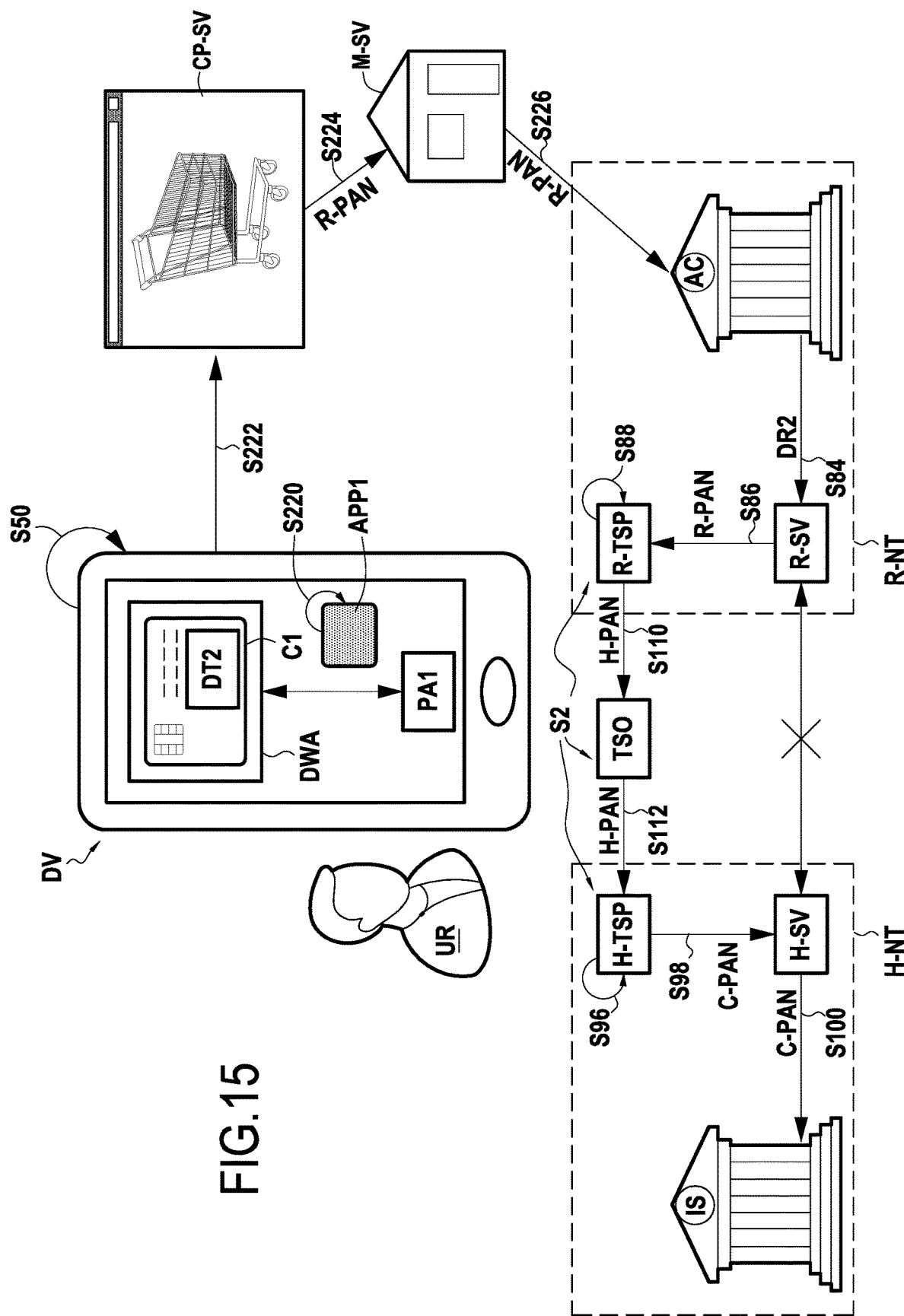

FIG. 15 represents a variant which differs from the previous embodiments in that a merchant's application APP1 is pre-installed in the mobile device DV of the user UR. In a case where the user UR wishes to perform an online payment transaction on a merchant's website using his mobile device DV, the user UR may execute or invoke (S220) the application APP1 pre-installed on the mobile device DV. In practice, the user UR may complete payment by triggering a checkout button in the merchant's application APP1 run on the mobile device DV. In response thereto, the mobile device DV transmits (S222) card data of the mobile payment card C1 to a checkout provider server CP-SV, i.e. card data, including the roaming token R-PAN, which was previously allocated to the mobile payment card C1 to operate in the roaming payment network R-NT.

In a step S224, the server CP-SV transmits the card data including the roaming token R-PAN to a server M-SV of a merchant. The server M-SV then transmits (S226) the transaction data along with the roaming token R-PAN to the bank system AC of the acquirer for proceeding with the payment transaction as already described earlier.

As can be understood from this embodiment, an in-app online transaction process may thus be applied to the concept of the present invention which is based on double-tokenization and double-detokenization.

The variants described earlier with respect to FIG. 12 may apply to any embodiment described in the present document, including the embodiments depicted in FIGS. 13, 14 and 15. Namely, the server TSO may be configured to perform the first detokenization step itself for all the embodiments described in the present document.

The flowcharts and/or block diagrams in the figures illustrate the configuration, operation and functionality of possible implementations of devices, systems, methods and computer program products according to various embodiments of the present disclosure. In this regard, each block in the flowcharts or block diagrams may represent a module, segment, or portion of code, which comprises one or more executable instructions for implementing the specified logical function(s).

While not explicitly described, the present embodiments may be employed in any combination or sub-combination thereof.

The present invention having been described in particular embodiments, it is clear that it is susceptible to numerous modifications and embodiments within the ability of those skilled in the art and without the exercise of the inventive faculty. Accordingly, the scope of the invention is defined by the scope of the following claims.

The invention claimed is:

1. A method implemented by a system comprising a first server of a home token service provider associated with an issuing bank of a mobile payment card, a second server of a roaming token service provider, a third server of a home banking network, and a fourth server of a roaming banking network, said method comprising:
    receiving, by the fourth server of the roaming banking network, a roaming token as part of transaction data characterizing an EMV payment transaction performed by a digital wallet application using the mobile payment card in the roaming banking network, the roaming token being allocated to the mobile payment card for operating in a roaming banking network;
    receiving, by the second server from the fourth server, said roaming token;
    obtaining, by the second server, a home token allocated to the mobile payment card for operating in a home banking network other than said roaming banking network, wherein the obtaining comprises identifying the home token based on a link between the roaming token and information previously stored in association with said roaming token in the roaming banking network;
    receiving, by the first server, the home token obtained by said second server;
    obtaining, by the first server, a primary card number of the mobile payment card for operating in the home banking network based on the home token and information previously stored in association with said home token;

providing, by the first server, the primary card number to the third server; and sending, by the third server, the primary card number in a transaction request to the issuing bank for authentication of the EMV payment transaction by the issuing bank based at least in part on the primary card number.

2. The method of claim 1, further comprising, before the second server receives the roaming token:

receiving, by the first server, a first identifier associated with the home token;

determining, by the first server, the home token based on the first identifier;

receiving, by the second server, the home token determined by said first server; and storing, by the second server, the home token in association with the roaming token.

3. The method of claim 1, wherein said third and fourth servers are connected via a host-to-host connection, and wherein the home token provided to the third server is routed from the fourth server using the host-to-host connection between the third and fourth servers.

4. The method of claim 1, wherein the primary card number is sent by the third server after receiving said primary card number from the first server.

5. The method of claim 1, wherein the system further comprises a fifth server of a token service operator, said method further comprising:

routing, by the fifth server, a transaction request including the home token from the second server to the first server.

6. A non-transitory recording medium readable by a computer and having recorded thereon a computer program including instructions that when executed by one or more computers comprising a first server of a home token service provider associated with an issuing bank of a mobile payment card, a second server, a third server, and a fourth server, perform a method comprising:

receiving, by the fourth server of a roaming banking network, a roaming token as part of transaction data characterizing an EMV payment transaction performed by a digital wallet application using a mobile payment card in the roaming banking network, the roaming token being allocated to the mobile payment card and linked to a home token via a link in a roaming banking network, wherein the home token is allocated to the mobile payment card for operating in a home banking network other than the roaming banking network;

receiving from the fourth server, by the second server of a roaming token service provider, the roaming token;

obtaining, by the second server, the home token allocated to the mobile payment card for operating in a home banking network other than said roaming banking network based on the link in the roaming network;

receiving, by the first server of the home token service provider, the home token;

obtaining, by the first server, based on the home token and information previously stored in association with said home token, a primary card number of the mobile payment card for operating in the home banking network;

providing, by the first server, the primary card number to the third server; and sending, by the third server, the primary card number in a transaction request to the issuing bank for authentication of the EMV payment transaction in the home banking network based at least in part on the primary card number.

7. A system comprising a first server of a home token service provider associated with a home banking network of a mobile payment card, a second server of a roaming token service provider, a third server of a home banking network and a fourth server of a roaming banking network, wherein the fourth server is configured to receive a roaming token as part of transaction data characterizing an EMV payment transaction performed by a digital wallet application (DWA) using a mobile payment card in the roaming banking network, the roaming token being allocated to the mobile payment card for operating in a roaming banking network, wherein a link between the roaming token and a home token is stored in the roaming network, wherein said second server comprises:

a first receiving module for receiving from the fourth server, the roaming token; and a first obtaining module for determining, based on the link in the roaming network, a home token allocated to the mobile payment card for operating in a home banking network other than said roaming banking network;

wherein the first server comprises:

a second receiving module for receiving the home token determined by said first obtaining module; and a second obtaining module for obtaining, based on the home token and information previously stored in association with said home token, a primary card number of the mobile payment card for operating in the home banking network;

wherein the third server is configured to send the primary card number to the home banking network in a transaction request for authentication of the EMV payment transaction in the home banking network based at least in part on the primary card number.

8. The system of claim 7, wherein:

the first server is configured to receive a first identifier associated with the home token and to identify the link based on the first identifier; and the second server is configured, before receiving the roaming token, to receive the home token determined by said first server and to store the home token linked with the roaming token for later retrieval by the first obtaining module.

9. The system of claim 7, said third and fourth servers being connected via a host-to-host connection, wherein:

the fourth server is configured to route the home token to the third server using the host-to-host connection between the third and fourth servers.

10. The system of claim 7, wherein said third server is configured to route a transaction request including the home token from the second server to the first server.

11. The medium of claim 6, wherein the method further comprises, before the second server receives the roaming token:

receiving, by the first server, a first identifier associated with the home token;

determining, by the first server, the home token based on the first identifier;

receiving, by the second server, the home token determined by said first server; and storing, by the second server, the home token linked with the roaming token.

* * * * *